US011659534B2

(12) United States Patent
Li et al.

(10) Patent No.: US 11,659,534 B2
(45) Date of Patent: May 23, 2023

(54) RESOURCE CONFIGURATION METHOD, NETWORK DEVICE, AND TERMINAL

(71) Applicant: HUAWEI TECHNOLOGIES CO., LTD., Guangdong (CN)

(72) Inventors: Junchao Li, Shanghai (CN); Hao Tang, Shanghai (CN); Zhenfei Tang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 204 days.

(21) Appl. No.: 17/106,454

(22) Filed: Nov. 30, 2020

(65) Prior Publication Data

US 2021/0084653 A1  Mar. 18, 2021

Related U.S. Application Data

(63) Continuation of application No. PCT/CN2019/089587, filed on May 31, 2019.

(30) Foreign Application Priority Data

Jun. 1, 2018 (CN) .......................... 201810554866.5

(51) Int. Cl.
*H04L 12/28* (2006.01)
*H04W 72/0453* (2023.01)
*H04J 1/16* (2006.01)

(52) U.S. Cl.
CPC .............................. *H04W 72/0453* (2013.01)

(58) Field of Classification Search
CPC .............. H04L 5/001; H04L 5/0098; H04W 72/0453; H04W 16/14; H04W 72/042
(Continued)

(56) References Cited

U.S. PATENT DOCUMENTS 10,932,287 B2 * 2/2021 Li .......................... H04L 1/1825
2018/0092090 A1 3/2018 Li et al.
(Continued)

FOREIGN PATENT DOCUMENTS

CN 107615858 A 1/2018
CN 107950000 A 4/2018
(Continued)

OTHER PUBLICATIONS

ZTE, ZTE Microelectronics, Implicit DC sub-carrier indication for wider band operation. 3GPP TSG RAN WG1 Meeting #88, Athens, Greece Feb. 13-17, 2017, R1-1701607, 5 pages.
(Continued)

*Primary Examiner* — John Pezzlo
(74) *Attorney, Agent, or Firm* — Womble Bond Dickinson (US) LLP

(57) ABSTRACT

The application provides a resource configuration method including: determining, by a network device, N downlink virtual carriers or determining N downlink virtual carriers and M uplink virtual carriers, where the N downlink virtual carriers are configured in a same cell, or the N downlink virtual carriers and the M uplink virtual carriers are configured in a same cell, and the cell includes at least one carrier, and the N downlink virtual carriers correspond to a same parameter set, or the N downlink virtual carriers correspond to a same parameter set, and the M uplink virtual carriers correspond to a same parameter set, N>1, and N≥M≥1; and sending, by the network device, configuration information to a terminal, where the configuration information is used to configure the N downlink virtual carriers or used to configure the N downlink virtual carriers and the M uplink virtual carriers.

20 Claims, 12 Drawing Sheets

(58) Field of Classification Search
USPC .................................. 370/252, 329, 430
See application file for complete search history.

(56) References Cited

U.S. PATENT DOCUMENTS

| | | | |
|---|---|---|---|
| 2020/0077432 A1* | 3/2020 | Xiong | H04L 1/1825 |
| 2020/0275428 A1* | 8/2020 | Yi | H04L 5/14 |
| 2020/0280337 A1* | 9/2020 | Yi | H04L 5/001 |
| 2020/0404690 A1* | 12/2020 | Lee | H04W 24/10 |

FOREIGN PATENT DOCUMENTS

| | | |
|---|---|---|
| CN | 108024265 A | 5/2018 |
| WO | 2017167257 A1 | 10/2017 |
| WO | 2018027900 A1 | 2/2018 |

OTHER PUBLICATIONS

Huawei, HiSilicon, Coexistence of different UE types on a wideband carrier. 3GPP TSG RAN WG1 Meeting NR#3, Nagoya, Japan, Sep. 18-21, 2017, R1-1715570, 6 pages.

* cited by examiner

RESOURCE CONFIGURATION METHOD, NETWORK DEVICE, AND TERMINAL

CROSS-REFERENCE TO RELATED APPLICATIONS

This application is a continuation of International Application No. PCT/CN2019/089587, filed on May 31, 2019, which claims priority to Chinese Patent Application No. 201810554866.5, filed on Jun. 1, 2018. The disclosures of the aforementioned applications are hereby incorporated by reference in their entireties

TECHNICAL FIELD

The application relates to the communications field, and more specifically, to a resource configuration method, a network device, and a terminal.

BACKGROUND

An operator has many noncontiguous spectrums in a low frequency band, and a segment of bandwidth, for example, 7.5 MHz bandwidth, with consecutive frequency domain resources in the noncontiguous spectrums may be non-standard. How to efficiently use these discrete spectrums and/or non-standard bandwidth spectrums to improve throughputs of a network device and a terminal is a problem that needs to be resolved in 5th generation (5th generation, 5G) new radio (new radio, NR).

SUMMARY

The application provides a resource configuration method. A plurality of virtual carriers with a same parameter set are configured in one cell, so that a discrete spectrum and/or a non-standard bandwidth spectrum can be efficiently used.

According to a first aspect, a resource configuration method is provided. The method includes: A network device determines N downlink virtual carriers or determines N downlink virtual carriers and M uplink virtual carriers. The N downlink virtual carriers are configured on at least one downlink carrier in a same cell, and the N downlink virtual carriers correspond to a same parameter set (numerology). Alternatively, the N downlink virtual carriers are configured on at least one downlink carrier in a same cell, the M uplink virtual carriers are configured on at least one uplink carrier in the cell, the N downlink virtual carriers correspond to a same parameter set, and the M uplink virtual carriers correspond to a same parameter set. $N>1$, $N \geq M \geq 1$, and both N and M are integers.

In an embodiment, the method may further include: The network device sends configuration information to the terminal, where the configuration information is used to configure the N downlink virtual carriers, or used to configure the N downlink virtual carriers and the M uplink virtual carriers.

It should be understood that the cell may be a serving cell of the terminal. The serving cell is described by a higher layer from a perspective of resource management, mobility management, or a service unit. Coverage of each network device may be divided into one or more serving cells, and the serving cell may be considered as including a frequency domain resource. In other words, a serving cell may include one or more carriers. The concept of carrier is described from a perspective of signal generation at a physical layer. One carrier is defined by one or more frequency channel numbers, corresponds to a contiguous or noncontiguous spectrum, and is used to carry communication data between the network device and the terminal. The downlink virtual carrier is a virtual carrier used for downlink transmission, and the uplink virtual carrier is a virtual carrier used for uplink transmission.

In an embodiment, the network device may configure a plurality of (for example, N) downlink virtual carriers with a same parameter set in one cell. Alternatively, the network device may configure a plurality of (for example, N) downlink virtual carriers with a same parameter set and one or more (for example, M) uplink virtual carriers with a same parameter set in one cell. In other words, the N downlink virtual carriers are configured in the same cell, or the N downlink virtual carriers and the M uplink virtual carriers are configured in the same cell. In addition, the N downlink virtual carriers correspond to the same parameter set, and the M uplink virtual carriers correspond to the same parameter set. For example, the N downlink virtual carriers correspond to a same subcarrier spacing, and the M uplink virtual carriers correspond to a same subcarrier spacing.

One cell may include one downlink carrier, and the downlink carrier may be contiguous or noncontiguous in frequency domain. The downlink carrier may be a plurality of consecutive spectrum resources of a discrete spectrum, or may be a contiguous spectrum of a segment of non-standard bandwidth. The network device may configure the N downlink virtual carriers on the downlink carrier.

Alternatively, one cell may include a plurality of downlink carriers, and the plurality of downlink carriers may be contiguous or noncontiguous in frequency domain and may or may not overlap in frequency domain. The plurality of downlink carriers may be a plurality of spectrum resources of a discrete spectrum, or may be a contiguous spectrum of a segment of non-standard bandwidth. The network device may configure at least one downlink virtual carrier on each of the plurality of downlink carriers.

One cell may include one uplink carrier, and the uplink carrier may be contiguous or noncontiguous in frequency domain. The uplink carrier may be a plurality of consecutive spectrum resources of a discrete spectrum, or may be a segment of non-standard contiguous bandwidth. The network device may configure the M uplink virtual carriers on the uplink carrier.

Alternatively, one cell may include a plurality of uplink carriers, and the plurality of uplink carriers may be contiguous or noncontiguous in frequency domain and may or may not overlap in frequency domain. The plurality of uplink carriers may be a plurality of spectrum resources of a discrete spectrum, or may be a contiguous spectrum of a segment of non-standard bandwidth. The network device may configure at least one uplink virtual carrier on each of the plurality of uplink carriers.

Relative positions of the N downlink virtual carriers in frequency domain are not limited in the application. For example, the N downlink virtual carriers may be contiguous or noncontiguous in frequency domain, and may or may not overlap in frequency domain. Relative positions of the M uplink virtual carriers in frequency domain are not limited in the application. For example, the M uplink virtual carriers may be contiguous or noncontiguous in frequency domain, and may or may not overlap in frequency domain. In addition, positions of the downlink virtual carriers relative to the uplink virtual carriers in frequency domain are not limited in the application. For example, a downlink virtual carrier and an uplink virtual carrier may or may not overlap in frequency domain.

In an embodiment, the configuration information may be radio resource control (radio resource control, RRC) signaling.

Further, the RRC signaling may be a system information block (system information block, SIB), or may be terminal-specific RRC signaling. This is not limited in this embodiment of the application.

According to the resource configuration method in an embodiment of the application, some discrete spectrums and/or non-standard bandwidth spectrums may be aggregated into one cell, and a plurality of virtual carriers, for example, the N downlink virtual carriers or the N downlink virtual carriers and the M uplink virtual carriers, with a same parameter set are configured in the cell, to enable the terminal to work on these discrete spectrums and/or non-standard bandwidth spectrums. In this way, throughputs of the network device and the terminal can be improved by efficiently using the discrete spectrums and/or the non-standard bandwidth spectrums. Specifically, for the network device, the plurality of virtual carriers with the same parameter set are configured in the cell, so that scheduling flexibility can be improved, and load balancing is facilitated. For the terminal, the plurality of virtual carriers with the same parameter set are configured in the cell, so that complexity of the terminal can be reduced, and a peak rate of a service with a single subcarrier spacing can be effectively increased.

With reference to the first aspect, in an embodiment, the method may further include: The network device determines a first downlink virtual carrier in the N downlink virtual carriers, where the first downlink virtual carrier is used to determine a carrier bandwidth part (bandwidth part, BWP) (denoted as a first BWP). The network device sends indication information (denoted as first indication information) to the terminal, where the first indication information is used to indicate the first downlink virtual carrier.

Specifically, in an embodiment, the network device may configure the first BWP in a downlink virtual carrier (for example, the first downlink virtual carrier). In this case, the network device may include an index of the first downlink virtual carrier in the first indication information, to indicate that the first BWP is configured in the first downlink virtual carrier. In another embodiment, the network device may configure the first BWP across virtual carriers. In other words, the first BWP may occupy resources of a plurality of virtual carriers. In this case, the network device may include, in the first indication information, an index of a virtual carrier (for example, the first downlink virtual carrier) at a start position (or an end position or any other position) of the first BWP, to indicate that the start position of the first BWP is relative to the first downlink virtual carrier.

In addition, the network device may further indicate a position (all positions in the application are positions in frequency domain) of the first BWP and/or a bandwidth value of the first BWP through the first indication information. For example, the first indication information may be used to indicate the start position and the end position of the first BWP, or the first indication information may be used to indicate the start position of the first BWP and the bandwidth value of the first BWP. For example, the first indication information may carry an offset (for example, denoted as a fourth offset) or an index (for example, denoted as a fourth index) to indicate the start position (or the end position or any other position) of the first BWP. An example in which the first indication information indicates the start position of the first BWP is used. The fourth offset may be an offset of a frequency domain resource at the start position of the first BWP relative to a start position or an end position of the first downlink virtual carrier. In addition, resource blocks on the first downlink virtual carrier may be numbered from an index 0 in a frequency increasing direction. In this case, the fourth index may correspond to a number of a resource block corresponding to the start position of the first BWP in the first downlink virtual carrier. It should be understood that, the resource blocks in the first downlink virtual carrier may alternatively be numbered from an index 1. This is not limited in this embodiment of the application. It should be understood that bandwidth of the first BWP may include X1 subcarriers. For example, the bandwidth of the first BWP may be Y1 resource blocks and X1 subcarriers.

In an embodiment, the first downlink virtual carrier includes a part or all of the first BWP. Alternatively, the first downlink virtual carrier partially or completely overlaps the first BWP in frequency domain.

With reference to the first aspect, in an embodiment, the method may further include: The network device determines a first uplink virtual carrier in the M uplink virtual carriers, where the first uplink virtual carrier is used to determine a carrier bandwidth part (bandwidth part, BWP) (denoted as a second BWP). The network device sends indication information (denoted as second indication information) to the terminal, where the second indication information is used to indicate the first uplink virtual carrier.

Specifically, in an embodiment, the network device may configure the second BWP in an uplink virtual carrier (for example, the first uplink virtual carrier). In this case, the network device may include an index of the first uplink virtual carrier in the second indication information, to indicate that the second BWP is configured in the first uplink virtual carrier. In another embodiment, the network device may configure the second BWP across virtual carriers. In other words, the second BWP may occupy resources of a plurality of virtual carriers. In this case, the network device may include, in the second indication information, an index of a virtual carrier (for example, the first uplink virtual carrier) at a start position (or an end position or any other position) of the second BWP, to indicate that the start position of the second BWP is relative to the first uplink virtual carrier.

In addition, the network device may further indicate a position of the second BWP and/or a bandwidth value of the second BWP through the second indication information. For example, the second indication information may be used to indicate the start position and the end position of the second BWP, or the second indication information may be used to indicate the start position of the second BWP and the bandwidth value of the second BWP. For example, the second indication information may carry an offset (for example, denoted as a fifth offset) or an index (for example, denoted as a fifth index) to indicate the start position (or the end position or any other position) of the second BWP. An example in which the second indication information indicates the start position of the second BWP is used. The fifth offset may be an offset of a frequency domain resource at the start position of the second BWP relative to the start position or the end position of the first uplink virtual carrier. In addition, resource blocks on the first uplink virtual carrier may be numbered from an index 0 in a frequency increasing direction. In this case, the fifth index may correspond to a number of a resource block corresponding to the start position of the second BWP in the first uplink virtual carrier. It should be understood that, the resource blocks in the first uplink virtual carrier may alternatively be numbered from an index 1. This is not limited in this embodiment of the application. It should be understood that bandwidth of the second BWP may include X2 subcarriers. For example, the bandwidth of the second BWP may be Y2 resource blocks and X2 subcarriers.

In an embodiment, the first uplink virtual carrier includes a part or all of the second BWP. Alternatively, the first uplink virtual carrier partially or completely overlaps the second BWP in frequency domain.

It should be understood that the first indication information and the second indication information may be carried by one piece of signaling, or may each be carried by one piece of signaling. This is not limited in this embodiment of the application.

It should be further understood that the first indication information and/or the second indication information and the configuration information may be carried by one piece of signaling, or may each be carried by one piece of signaling. This is not limited in this embodiment of the application. Alternatively, the configuration information may include the first indication information and/or the second indication information.

With reference to the first aspect, in an embodiment, the configuration information includes at least two offsets of at least two downlink virtual carriers in the N downlink virtual carriers, and the at least two offsets are offsets of frequency domain resources of the at least two downlink virtual carriers relative to a same reference point.

It should be understood that the at least two downlink virtual carriers are in a one-to-one correspondence with the at least two offsets. The at least two offsets may be offsets of frequency domain resources at start positions, end positions, or any other positions of the at least two downlink virtual carriers relative to a same reference point.

For example, the N downlink virtual carriers include a first downlink virtual carrier and a second downlink virtual carrier, and the configuration information includes a first offset and a second offset. The first offset is an offset of a frequency domain resource at a start position of the first downlink virtual carrier relative to a reference point, and the second offset is an offset of a frequency domain resource at a start position of the second downlink virtual carrier relative to the reference point.

Further, at least one of the at least two offsets includes B1 subcarriers, and B1 is an integer greater than 0.

For example, the first offset is A1 resource blocks, and the second offset includes B1 subcarriers. Alternatively, the first offset includes A2 subcarriers, and the second offset is B2 resource blocks. A1, A2, B1, and B2 are all integers greater than or equal to 0. For example, the first offset is A1 resource blocks, and the second offset is B1 subcarriers. Alternatively, the first offset is A1 resource blocks, and the second offset is C1 resource blocks plus B1 subcarriers.

Alternatively, the first offset is A3 subcarriers, and the second offset is B3 subcarriers. A3 and B3 are both integers greater than or equal to 0.

Alternatively, the first offset is A4 resource blocks, and the second offset is B4 resource blocks. A4 and B4 are both integers greater than or equal to 0.

In addition, the second offset may alternatively be an offset of a frequency domain resource at the start position of the second downlink virtual carrier relative to an end position of the first downlink virtual carrier.

According to the foregoing method, the start positions of the first downlink virtual carrier and the second downlink virtual carrier in frequency domain may be determined.

In addition, in a possible embodiment, the network device may not configure the second offset. In other words, the configuration information may not include the second offset. In this case, the terminal assumes that an index of a start common resource block of the second downlink virtual carrier is an index of an end common resource block of the first downlink virtual carrier plus 1. In other words, the terminal considers that an index of a common resource block corresponding to the start position of the second downlink virtual carrier in frequency domain is an index of a common resource block corresponding to the start position of the first downlink virtual carrier in frequency domain plus 1.

It should be understood that, in the application, a similar method may also be used to configure a position of each uplink virtual carrier. For example, the configuration information may include an offset of at least one uplink virtual carrier in the M uplink virtual carriers, and the offset is an offset of a frequency domain resource at a start position of the uplink virtual carrier relative to a reference point. When M>1, the configuration information may further include offsets of other uplink virtual carriers in the M uplink virtual carriers, and the offsets are offsets of frequency domain resources at start positions of the other uplink virtual carriers relative to the same reference point.

Generally, the common resource blocks (RBs) are numbered from an index 0 in a frequency increasing direction, and the reference point is a start position, in frequency domain, of a common resource block whose index is 0. Indexes of the common resource blocks may alternatively start from 1. This is not limited in this embodiment of the application. It should be understood that different subcarrier spacings correspond to different common resource block indexes. The reference point may be directly indicated by the network device. For example, the network device may send indication information to the terminal through higher layer signaling or physical layer signaling, and the indication information is used to indicate the reference point. It should be understood that the higher layer signaling may be RRC signaling, a media access control control element (MAC CE), or the like. Alternatively, the reference point may be determined based on an offset Ost 0 between the reference point and a reference frequency position. The offset Ost 0 may be predefined, or may be configured by the network device. This is not limited in this embodiment of the application. For example, for a downlink carrier of a primary cell, the reference frequency position is determined based on an RB with a lowest frequency in synchronization signal blocks accessed by the terminal. For an uplink carrier of a primary cell on a non-paired spectrum, the reference frequency position is determined based on an RB with a lowest frequency in synchronization signal blocks accessed by UE. For an uplink carrier of a primary cell on a paired spectrum, the reference frequency position is determined based on a frequency position configured by a base station, and the frequency position may correspond to an absolute radio frequency channel number (ARFCN). For a secondary cell, the reference frequency position is determined based on a frequency position configured by a base station, and the frequency position may correspond to an absolute radio frequency channel number ARFCN. For a supplemental uplink carrier, the reference frequency position is determined based on a frequency position configured by a base station, and the frequency position may correspond to an absolute radio frequency channel number ARFCN.

With reference to the first aspect, in an embodiment, the N downlink virtual carriers further include a third downlink virtual carrier, and the configuration information further includes a third offset;

the third offset is an offset of a frequency domain resource at a start position of the third downlink virtual carrier relative to the reference point, or an offset of a frequency domain resource at a start position of the third downlink virtual carrier relative to an end position of the second downlink virtual carrier, or an offset of a frequency domain resource at a start position of the third downlink virtual carrier relative to the end position of the first downlink virtual carrier.

Therefore, the start position of the third downlink virtual carrier in frequency domain may be determined according to the foregoing method.

With reference to the first aspect, in an embodiment, the configuration information includes indexes of common resource blocks corresponding to at least two downlink virtual carriers in the N downlink virtual carriers, and the common resource blocks corresponding to the at least two downlink virtual carriers have a same reference point.

It should be understood that the index that is of the common resource block and that is included in the configuration information may be an index of a common resource block corresponding to a start position, an end position, or any other position of a corresponding downlink virtual carrier.

For example, the N downlink virtual carriers include a first downlink virtual carrier and a second downlink virtual carrier, and the configuration information includes a first index and a second index. The first index is an index of a common resource block corresponding to a start position of the first downlink virtual carrier, and the second index is an index of a common resource block corresponding to a start position of the second downlink virtual carrier. Therefore, the start positions of the first downlink virtual carrier and the second downlink virtual carrier in frequency domain may be determined through the first index and the second index.

It should be understood that the reference point herein may be the reference point described above. However, this is not limited in this embodiment of the application.

With reference to the first aspect, in an embodiment, the N downlink virtual carriers include a first downlink virtual carrier and a second downlink virtual carrier, and the configuration information includes a first index, a second index, and a third offset. The first index is an index of a common resource block corresponding to a start position of the first downlink virtual carrier, and the second index and the third offset are used to determine a start position of the second downlink virtual carrier. Alternatively, the first index and the third offset are used to determine a start position of the first downlink virtual carrier, and the second index is an index of a common resource block corresponding to a start position of the second downlink virtual carrier.

Therefore, the start positions of the first downlink virtual carrier and the second downlink virtual carrier in frequency domain may be determined through the first index, the second index, and the third offset.

With reference to the first aspect, in an embodiment, the N downlink virtual carriers include a first downlink virtual carrier and a second downlink virtual carrier, and the configuration information includes a first index, a second index, a third offset, and a fourth offset, the first index and the third offset are used to determine a start position of the first downlink virtual carrier, and the second index and the fourth offset are used to determine a start position of the second virtual carrier.

Therefore, the start positions of the first downlink virtual carrier and the second downlink virtual carrier in frequency domain may be determined through the first index, the second index, the third offset, and the fourth offset.

With respect to the first aspect, in an embodiment, the method may further include:

The network device determines a resource grid on the N downlink virtual carriers. The network device maps a to-be-transmitted signal to the determined resource grid, to obtain an orthogonal frequency division multiplexing (OFDM) baseband signal. The network device sends the OFDM baseband signal.

Specifically, all subcarriers (that is, $N_{grid}^{size}$ subcarriers) included in the N downlink virtual carriers form the resource grid. $N_{grid}^{size} > 1$, and $N_{grid}^{size}$ is an integer. During signal transmission, the network device may map the to-be-transmitted signal to the $N_{grid}^{size}$ subcarriers, to obtain the OFDM baseband signal.

It should be understood that the $N_{grid}^{size}$ subcarriers are subcarriers that can be used for signal transmission and that are in the N downlink virtual carriers, and the to-be-transmitted signal may also be referred to as a complex value (complex value).

It should be understood that, in an embodiment of the application, the terminal and the network device may learn of, through protocol specification or predefinition, the resource grid defined on the N downlink virtual carriers.

According to the resource configuration method in this embodiment of the application, because there is only one resource grid on the N downlink virtual carriers, for one to-be-transmitted signal, the network device sends a relatively long OFDM baseband signal. This helps reduce a peak to average power ratio (PAPR), and reduce spectrum spreading interference and in-band signal distortion, and this also helps uniformly suppress noise interference, thereby obtaining better transmission quality.

With reference to the first aspect, in an embodiment, the N downlink virtual carriers include a first downlink virtual carrier and a second downlink virtual carrier. The first downlink virtual carrier includes $N_{grid,1}^{size}$ subcarriers, the second downlink virtual carrier includes $N_{grid,2}^{size}$ subcarriers, and both $N_{grid,1}^{size}$ and $N_{grid,2}^{size}$ are integers greater than 0. In addition, the OFDM baseband signal includes a first summation item and a second summation item. The first summation item is a sum of to-be-transmitted signals on the $N_{grid,1}^{size}$ subcarriers, and the second summation item is a sum of to-be-transmitted signals on the $N_{grid,2}^{size}$ subcarriers.

In an embodiment, a summation upper bound of the first summation item and a summation lower bound of the second summation item are determined based on total bandwidth of the first downlink virtual carrier and the second downlink virtual carrier, and positions and bandwidth values of the first downlink virtual carrier and the second downlink virtual carrier in frequency domain.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}+M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of the first downlink virtual carrier. An absolute value of $M_2$ is a quantity of subcarriers included in a frequency domain resource between the configured frequency position and a start position of the second downlink virtual carrier.

In an embodiment, the configured frequency position may be predefined or configured by the network device in real time.

In an embodiment, the configured frequency position is a center frequency position between a start position of the first downlink virtual carrier and an end position of the second downlink virtual carrier.

It should be understood that, in the application, any two subcarriers whose index difference is 1 are adjacent in frequency domain, and a larger index indicates a higher frequency of a corresponding subcarrier.

In another embodiment, the first downlink virtual carrier corresponds to a first phase offset, and the second downlink virtual carrier corresponds to a second phase offset. The first phase offset and the second phase offset are determined based on a position of the first downlink virtual carrier in frequency domain, a position of the second downlink virtual carrier in frequency domain, a bandwidth value of the first downlink virtual carrier, and a bandwidth value of the second downlink virtual carrier.

Further, when a frequency corresponding to the end position of the first downlink virtual carrier is lower than a frequency corresponding to the start position of the second downlink virtual carrier, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

In the foregoing parameters, $-M_1+x$ is the first phase offset, $M_2+x$ is the second phase offset, k is an index of a subcarrier in the resource grid, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, and $a_{k,l}$ represents the to-be-transmitted signal that is mapped to a symbol whose index is l and to a subcarrier whose index is k in the resource grid. t represents any time in a time unit, and the time unit may be anyone of a system frame, a subframe, a slot, or a mini-slot. $k_0$ represents a subcarrier-level offset, $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of the first downlink virtual carrier. An absolute value of $M_2$ is a quantity of subcarriers included in a frequency domain resource between the configured frequency position and a start position of the second downlink virtual carrier.

In an embodiment, the configured frequency position may be predefined or configured by the network device in real time.

In an embodiment, the configured frequency position is a center frequency position between a start position of the first downlink virtual carrier and an end position of the second downlink virtual carrier.

With respect to the first aspect, in an embodiment, the method may further include:

The network device determines a resource grid on the M uplink virtual carriers. The network device receives an orthogonal frequency division multiplexing (orthogonal frequency division multiplexing, OFDM) baseband signal based on the determined resource grid. All subcarriers included in the M uplink virtual carriers form the resource grid.

It should be understood that the resource grid on the M uplink virtual carriers is similar to the resource grid on the N downlink virtual carriers. For details, refer to the foregoing descriptions of the resource grid on the M uplink virtual carriers. Details are not described herein again.

According to a second aspect, a resource configuration method is provided. The method includes: A terminal determines N downlink virtual carriers or determines N downlink virtual carriers and M uplink virtual carriers. The N downlink virtual carriers are configured on at least one downlink carrier in a same cell, and the N downlink virtual carriers correspond to a same parameter set. Alternatively, the N downlink virtual carriers are configured on at least one downlink carrier in a same cell, the M uplink virtual carriers are configured on at least one uplink carrier in the cell, the N downlink virtual carriers correspond to a same parameter set, and the M uplink virtual carriers correspond to a same parameter set. N>1, N≥M≥1, and both N and M are integers.

In an embodiment, the parameter set includes a subcarrier spacing.

In an embodiment, the terminal may determine the N downlink virtual carriers by receiving configuration information sent by a network device, where the configuration information is used to configure the N downlink virtual carriers.

In an embodiment, the terminal may determine the N downlink virtual carriers and the M uplink virtual carriers by receiving configuration information sent by a network device, where the configuration information is used to configure the N downlink virtual carriers and the M uplink virtual carriers.

According to the resource configuration method in an embodiment of the application, some discrete spectrums and/or non-standard bandwidth spectrums may be aggregated into one cell, and a plurality of virtual carriers, for example, the N downlink virtual carriers or the N downlink virtual carriers and the M uplink virtual carriers, with a same parameter set are configured in the cell, to enable the terminal to work on these discrete spectrums and/or non-standard bandwidth spectrums. In this way, throughputs of the network device and the terminal can be improved by efficiently using the discrete spectrums and/or the non-standard bandwidth spectrums. Specifically, for the network device, the plurality of virtual carriers with the same parameter set are configured in the cell, so that scheduling flexibility can be improved, and load balancing is facilitated. For the terminal, the plurality of virtual carriers with the same parameter set are configured in the cell, so that complexity of the terminal can be reduced, and a peak rate of a service with a single subcarrier spacing can be effectively increased.

With reference to the second aspect, in an embodiment, the method may further include: The terminal receives indication information (denoted as first indication information) sent by the network device. The terminal determines a first downlink virtual carrier in the N downlink virtual carriers based on the first indication information. The terminal determines a BWP (denoted as a first BWP) based on the first downlink virtual carrier.

With reference to the second aspect, in an embodiment, the method may further include: The terminal receives indication information (denoted as second indication information) sent by the network device. The terminal determines a first uplink virtual carrier in the M uplink virtual carriers based on the second indication information. The terminal determines a BWP (denoted as a second BWP) based on the first uplink virtual carrier.

It should be understood that the second indication information and the second indication information may be carried by one piece of signaling, or may each be carried by one piece of signaling. This is not limited in this embodiment of the application.

It should be further understood that the first indication information and/or the second indication information and the configuration information may be carried by one piece of signaling, or may each be carried by one piece of signaling. This is not limited in this embodiment of the application. Alternatively, the configuration information may include the first indication information and/or the second indication information.

With reference to the second aspect, in an embodiment, the configuration information includes at least two offsets of at least two downlink virtual carriers in the N downlink virtual carriers, and the at least two offsets are offsets of frequency domain resources of the at least two downlink virtual carriers relative to a same reference point. It should be understood that the at least two downlink virtual carriers are in a one-to-one correspondence with the at least two offsets.

For example, the N downlink virtual carriers include a first downlink virtual carrier and a second downlink virtual carrier, and the configuration information includes a first offset and a second offset. The first offset is an offset of a frequency domain resource at a start position of the first downlink virtual carrier relative to a reference point, and the second offset is an offset of a frequency domain resource at a start position of the second downlink virtual carrier relative to the reference point or an offset of a frequency domain resource at a start position of the second downlink virtual carrier relative to an end position of the first downlink virtual carrier.

According to the foregoing method, the start positions of the first downlink virtual carrier and the second downlink virtual carrier in frequency domain may be determined.

Further, the N downlink virtual carriers further include a third downlink virtual carrier, and the configuration information further includes a third offset; the third offset is an offset of a frequency domain resource at a start position of the third downlink virtual carrier relative to the reference point, or an offset of a frequency domain resource at a start position of the third downlink virtual carrier relative to an end position of the second downlink virtual carrier, or an offset of a frequency domain resource at a start position of the third downlink virtual carrier relative to the end position of the first downlink virtual carrier.

Therefore, the start position of the third downlink virtual carrier in frequency domain may be determined according to the foregoing method.

It should be understood that, in the application, a similar method may also be used to configure a position of each uplink virtual carrier in frequency domain. For example, the configuration information may include an offset of at least one uplink virtual carrier in the M uplink virtual carriers, and the offset is an offset of a frequency domain resource at a start position of the uplink virtual carrier relative to a reference point. When M>1, the configuration information may further include offsets of other uplink virtual carriers in the M uplink virtual carriers, and the offsets are offsets of frequency domain resources at start positions of the other uplink virtual carriers relative to the same reference point.

With reference to the second aspect, in an embodiment, at least one of the at least two offsets includes B1 subcarriers, and B1 is an integer greater than 0.

For example, the first offset is A1 resource blocks, and the second offset includes B1 subcarriers. Alternatively, the first offset includes A2 subcarriers, and the second offset is B2 resource blocks. A1, A2, B1, and B2 are all integers greater than or equal to 0.

Alternatively, the first offset is A3 subcarriers, and the second offset is B3 subcarriers. A3 and B3 are both integers greater than or equal to 0.

With reference to the second aspect, in an embodiment, the first offset is A4 resource blocks, and the second offset is B4 resource blocks. A4 and B4 are both integers greater than or equal to 0.

With reference to the second aspect, in an embodiment, the configuration information includes indexes of common resource blocks corresponding to at least two downlink virtual carriers in the N downlink virtual carriers, and the common resource blocks corresponding to the at least two downlink virtual carriers have a same reference point.

It should be understood that the index that is of the common resource block and that is included in the configuration information may be an index of a common resource block corresponding to a start position, an end position, or any other position of a corresponding downlink virtual carrier.

For example, the N downlink virtual carriers include a first downlink virtual carrier and a second downlink virtual carrier, and the configuration information includes a first index and a second index. The first index is an index of a common resource block corresponding to a start position of the first downlink virtual carrier, and the second index is an index of a common resource block corresponding to a start position of the second downlink virtual carrier.

With reference to the second aspect, in an embodiment, the N downlink virtual carriers include a first downlink virtual carrier and a second downlink virtual carrier, and the configuration information includes a first index, a second index, and a third offset. The first index is an index of a common resource block corresponding to a start position of the first downlink virtual carrier, and the second index and the third offset are used to determine a start position of the second virtual carrier. Alternatively, the first index and the third offset are used to determine a start position of the first downlink virtual carrier, and the second index is an index of a common resource block corresponding to a start position of the second downlink virtual carrier.

With reference to the second aspect, in an embodiment, the N downlink virtual carriers include a first downlink virtual carrier and a second downlink virtual carrier, and the configuration information includes a first index, a second index, a third offset, and a fourth offset.

The first index and the third offset are used to determine a start position of the first downlink virtual carrier, and the second index and the fourth offset are used to determine a start position of the second virtual carrier.

Therefore, the start positions of the first downlink virtual carrier and the second downlink virtual carrier in frequency domain may be determined through the first index, the second index, the third offset, and the fourth offset.

With respect to the second aspect, in an embodiment, the method may further include:

The terminal determines a resource grid on the N downlink virtual carriers. The network device receives an OFDM baseband signal based on the determined resource grid. All subcarriers (that is, $N_{grid}^{size}$ subcarriers) included in the N downlink virtual carriers form the resource grid. $N_{grid}^{size} > 1$, and $N_{grid}^{size}$ is an integer.

For the OFDM baseband signal mapped to the resource grid on the N downlink virtual carriers, refer to the descriptions in the first aspect, and details are not described herein again.

With respect to the second aspect, in an embodiment, the method may further include:

The terminal determines a resource grid on the M uplink virtual carriers. The terminal maps a to-be-transmitted signal to the determined resource grid, to obtain an OFDM baseband signal. The terminal sends the OFDM baseband signal. All subcarriers included in the M uplink virtual carriers form the resource grid.

It should be understood that the resource grid on the M uplink virtual carriers is similar to the resource grid on the N downlink virtual carriers. For details, refer to the foregoing descriptions of the resource grid on the M uplink virtual carriers. Details are not described herein again.

It should be understood that, for some embodiments of the second aspect and corresponding technical effects, refer to the descriptions of the first aspect. Details are not described herein again.

According to a third aspect, a communication method is provided. The method includes: A transmit end maps a to-be-transmitted signal to a resource grid on a virtual carrier, to obtain an orthogonal frequency division multiplexing OFDM baseband signal. The transmit end sends the OFDM baseband signal.

The virtual carrier includes P subcarriers, an unavailable resource in the virtual carrier includes M subcarriers in the P subcarriers, the resource grid includes P−M subcarriers other than the M subcarriers in the P subcarriers, $P > M \geq 1$, and P and M are both integers. Alternatively, the resource grid includes $N_{grid}^{size}$ available subcarriers, the virtual carrier includes the $N_{grid}^{size}$ available subcarriers and M unavailable subcarriers, $N_{grid}^{size} > M \geq 1$, and both $N_{grid}^{size}$ and M are integers. It should be understood that $N_{grid}^{size} = P - M$.

It should be understood that the transmit end may be a terminal, and the receive end may be a network device. In addition, when the transmit end is a terminal, the virtual carrier is an uplink virtual carrier. Alternatively, the transmit end may be a network device, and the receive end may be a terminal. In addition, when the transmit end is a network device, the virtual carrier is a downlink virtual carrier.

It should be understood that the available subcarrier is a subcarrier that can be used for signal transmission, and the unavailable subcarrier is a subcarrier that cannot be used for signal transmission. The to-be-transmitted signal may also be referred to as a complex value.

In an embodiment, the M subcarriers (that is, the M unavailable subcarriers) are first-type subcarriers, or the M subcarriers include the first-type subcarriers and second-type subcarriers.

For example, the first-type subcarrier is a subcarrier with a high interference level, and the receive end needs to perform interference isolation through radio frequency filtering. The second-type subcarrier is a subcarrier with a low interference level, and the receive end may perform interference isolation through baseband filtering.

It should be understood that, in an embodiment of the application, the terminal and the network device may learn of, through protocol specification or predefinition, the resource grid on the virtual carrier. For example, it may be specified in a protocol that the resource grid includes only the available subcarriers on the virtual carrier. After the terminal learns of a configuration of the virtual carrier, for example, after the terminal learns of, through resource configuration information sent by the network device, information about a bandwidth value of the virtual carrier, information about a start position or an end position of the virtual carrier, information about a start position, a central position, or an end position of the unavailable resource in frequency domain, and information about a size of a frequency domain resource occupied by the unavailable resource, the resource grid or a form of the resource grid can be determined.

According to the communication method in this embodiment of the application, the resource grid is defined on an available resource (for example, the available subcarrier) of the virtual carrier, so that the to-be-transmitted signal is more properly mapped to the resource grid, thereby improving transmission efficiency. In addition, because there is only one resource grid on the virtual carrier, for one to-be-transmitted signal, the transmit end sends a relatively long OFDM baseband signal. This helps reduce a peak to average power ratio (PAPR), and reduce spectrum spreading interference and in-band signal distortion, and this also helps uniformly suppress noise interference, thereby obtaining better transmission quality.

With reference to the third aspect, in an embodiment, the P−M subcarriers include contiguous $N_{grid,1}^{size}$ subcarriers in frequency domain and contiguous $N_{grid,2}^{size}$ subcarriers in frequency domain, and $N_{grid,1}^{size}$ and $N_{grid,2}^{size}$ both are integers greater than 0.

The OFDM baseband signal includes a first summation item and a second summation item. The first summation item is a sum of the to-be-transmitted signals on the $N_{grid,1}^{size}$ subcarriers, and the second summation item is a sum of the to-be-transmitted signals on the $N_{grid,2}^{size}$ subcarriers.

In an embodiment, a summation upper bound of the first summation item and a summation lower bound of the second summation item are determined based on bandwidth of the virtual carrier, a position of the unavailable resource in frequency domain, and bandwidth of the unavailable resource.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and
the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}-M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment. The first segment corresponds to positions of the $N_{grid,1}^{size}$ subcarriers in frequency domain, and the second segment corresponds to positions of the $N_{grid,2}^{size}$ subcarriers in frequency domain.

In an embodiment, the configured frequency position may be predefined or configured by the network device in real time.

In an embodiment, the configured frequency position is a center frequency position between a start position of the first downlink virtual carrier and an end position of the second downlink virtual carrier.

In an embodiment, the first summation item corresponds to a first phase offset, and the second summation item corresponds to a second phase offset. The first phase offset and the second phase offset are determined based on a frequency domain position of the first segment, a bandwidth value of the first segment, a frequency domain position of the second segment, and a bandwidth value of the second segment. The first segment corresponds to positions of the $N_{grid,1}^{size}$ subcarriers in frequency domain, and the second segment corresponds to positions of the $N_{grid,2}^{size}$ subcarriers in frequency domain.

Further, when a frequency corresponding to the end position of the first segment is lower than a frequency corresponding to the start position of the second segment, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

In the foregoing parameters, $-M_1+x$ is the first phase offset, $M_2+x$ is the second phase offset, k is an index of a subcarrier in the resource grid, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, and $a_{k,l}$ represents the to-be-transmitted signal that is mapped to a symbol whose index is l and to a subcarrier whose index is k in the resource grid. t represents any time in a time unit, and the time unit may be anyone of a system frame, a subframe, a slot, or a mini-slot. $k_0$ represents a subcarrier-level offset, $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment.

In an embodiment, the configured frequency position may be predefined or configured by the network device in real time.

In an embodiment, the configured frequency position is a center frequency position between a start position of the first segment and an end position of the second segment.

With reference to the third aspect, in an embodiment, if the transmit end is a network device, and the receive end is a terminal, the method further includes:

The network device sends the resource configuration information to the terminal. Correspondingly, the terminal receives the resource configuration information sent by the network device. The resource configuration information includes the information about the bandwidth value of the virtual carrier and the information about the start position or the end position of the virtual carrier, and the resource configuration information includes the information about the start position, the central position, or the end position of the unavailable resource in frequency domain, and the information about the size of the frequency domain resource occupied by the unavailable resource. The terminal may determine sizes and positions of the available resource and the unavailable resource in frequency domain based on the resource configuration information.

According to a fourth aspect, a communication method is provided. The method includes: A receive end determines a resource grid on a virtual carrier and receives an OFDM baseband signal based on the determined resource grid. The virtual carrier includes P subcarriers, an unavailable resource in the virtual carrier includes M subcarriers in the P subcarriers, the resource grid includes P−M subcarriers other than the M subcarriers in the P subcarriers, P>M≥1, and P and M are both integers. Alternatively, the resource grid includes $N_{grid}^{size}$ available subcarriers, the virtual carrier includes the $N_{grid}^{size}$ available subcarriers and M unavailable subcarriers, $N_{grid}^{size}$>M≥1, and both $N_{grid}^{size}$ and M are integers. It should be understood that $N_{grid}^{size}$=P−M.

It should be understood that the transmit end may be a terminal, and the receive end may be a network device. In addition, when the transmit end is a terminal, the virtual carrier is an uplink virtual carrier. Alternatively, the transmit end may be a network device, and the receive end may be a terminal. In addition, when the transmit end is a network device, the virtual carrier is a downlink virtual carrier.

According to the communication method in an embodiment of the application, the resource grid is defined on an available resource of the virtual carrier, so that the to-be-transmitted signal is more properly mapped to the resource grid, thereby improving transmission efficiency. In addition, because there is only one resource grid on the virtual carrier, for one to-be-transmitted signal, the transmit end sends a relatively long OFDM baseband signal. This helps reduce a peak to average power ratio (peak to average power ratio, PAPR), and reduce spectrum spreading interference and in-band signal distortion, and this also helps uniformly suppress noise interference, thereby obtaining better transmission quality.

With reference to the fourth aspect, in an embodiment, the P−M subcarriers include contiguous $N_{grid,1}^{size}$ a subcarriers in frequency domain and contiguous $N_{grid,2}^{size}$ subcarriers in frequency domain, and $N_{grid,1}^{size}$ and $N_{grid,2}^{size}$ both are integers greater than 0.

The OFDM baseband signal includes a first summation item and a second summation item. The first summation item is a sum of the to-be-transmitted signals on the $N_{grid,1}^{size}$ subcarriers, and the second summation item is a sum of the to-be-transmitted signals on the $N_{grid,2}^{size}$ subcarriers.

In an embodiment, a summation upper bound of the first summation item and a summation lower bound of the second summation item are determined based on bandwidth of the virtual carrier, a position of the unavailable resource in frequency domain, and bandwidth of the unavailable resource.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}+M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment. The first segment corresponds to positions of the $N_{grid,1}^{size}$ subcarriers in frequency domain, and the second segment corresponds to positions of the $N_{grid,2}^{size}$ subcarriers in frequency domain.

In an embodiment, the configured frequency position may be predefined or configured by the network device in real time.

In an embodiment, the configured frequency position is a center frequency position between a start position of the first downlink virtual carrier and an end position of the second downlink virtual carrier.

In an embodiment, the first summation item corresponds to a first phase offset, and the second summation item corresponds to a second phase offset. The first phase offset and the second phase offset are determined based on a frequency domain position of the first segment, a bandwidth value of the first segment, a frequency domain position of the second segment, and a bandwidth value of the second segment. The first segment corresponds to positions of the $N_{grid,1}^{size}$ subcarriers in frequency domain, and the second segment corresponds to positions of the $N_{grid,2}^{size}$ subcarriers in frequency domain.

Further, when a frequency corresponding to the end position of the first segment is lower than a frequency corresponding to the start position of the second segment, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

In the foregoing parameters, $-M_1+x$ is the first phase offset, $M_2+x$ is the second phase offset, k is an index of a subcarrier in the resource grid, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, and $a_{k,l}$ represents the to-be-transmitted signal that is mapped to a symbol whose index is l and to a subcarrier whose index is k in the resource grid. t represents any time in a time unit, and the time unit may be anyone of a system frame, a subframe, a slot, or a mini-slot. $k_0$ represents a subcarrier-level offset, $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment.

In an embodiment, the configured frequency position may be predefined or configured by the network device in real time.

In an embodiment, the configured frequency position is a center frequency position between a start position of the first segment and an end position of the second segment.

With reference to the fourth aspect, in an embodiment, if the receive end is a terminal, the method further includes:

receiving resource configuration information, where the resource configuration information includes the information about the bandwidth value of the virtual carrier and the information about the start position or the end position of the virtual carrier, and the resource configuration information includes the information about the start position, the central position, or the end position of the unavailable resource in frequency domain, and the information about the size of the frequency domain resource occupied by the unavailable resource. In this way, the terminal may determine sizes and positions of the available resource and the unavailable resource in frequency domain based on the resource configuration information.

According to a fifth aspect, a communication method is provided. The method includes: A transmit end determines a resource grid on a virtual carrier based on at least two resource sets constituting one virtual carrier, where a quantity of subcarriers included in the at least two resource sets is equal to a quantity of subcarriers included in the resource network, each resource set includes at least one subcarrier, and when the at least one subcarrier is a plurality of subcarriers, the at least one subcarrier is contiguous in frequency domain. The transmit end maps a to-be-transmitted signal to the resource grid, to obtain an orthogonal frequency division multiplexing OFDM baseband signal. The transmit end sends the OFDM baseband signal.

It should be understood that the transmit end may be a terminal, and correspondingly, a receive end may be a network device. In addition, when the transmit end is a terminal, the virtual carrier is an uplink virtual carrier. Alternatively, the transmit end may be a network device, and correspondingly, the receive end may be a terminal. In addition, when the transmit end is a network device, the virtual carrier is a downlink virtual carrier.

Therefore, according to the communication method in this embodiment of the application, a plurality of discrete spectrum resources or non-standard bandwidth spectrum resources may be aggregated by using one virtual carrier, to enable efficient communication on a discrete spectrum or anon-standard bandwidth spectrum. In addition, a relatively long OFDM baseband signal is generated on the virtual carrier. This helps reduce a peak to average power ratio (peak to average power ratio, PAPR), and reduce spectrum spreading interference and in-band signal distortion, and this also helps suppress noise interference, thereby obtaining better transmission quality.

In an embodiment of the application, the network device may further configure, for the terminal, categories or interference levels of subcarriers between two inconsecutive resource sets in frequency domain. For example, the network device may configure that the subcarriers between the two inconsecutive resource sets in frequency domain include a first-type subcarrier and a second-type subcarrier. The first-type subcarrier is a subcarrier with a high interference level, and the terminal needs to perform interference isolation through radio frequency filtering. The second-type subcarrier is a subcarrier with a low interference level, and the terminal may perform interference isolation through baseband filtering.

With reference to the fifth aspect, in an embodiment, each resource set corresponds to one phase offset, and each phase offset is determined based on a frequency domain position and bandwidth of at least one subcarrier included in the resource set corresponding to the phase offset.

With reference to the fifth aspect, in an embodiment, the at least two resource sets include a first resource set and a second resource set, the first resource set includes $N_{grid,1}^{size}$ subcarriers, the second resource set includes $N_{grid,2}^{size}$ subcarriers, the $N_{grid,1}^{size}$ subcarriers correspond to a first segment in the virtual carrier, the $N_{grid,2}^{size}$ subcarriers correspond to a second segment in the virtual carrier, and both $N_{grid,1}^{size}$ and $N_{grid,2}^{size}$ are integers greater than 0, the OFDM baseband signal includes a first summation item and a second summation item, the first summation item is a sum of the to-be-transmitted signals on the $N_{grid,1}^{size}$ subcarriers, and the second summation item is a sum of the to-be-transmitted signals on the $N_{grid,2}^{size}$ subcarriers.

In an embodiment, the first summation item corresponds to a first phase offset, and the second summation item corresponds to a second phase offset. The first phase offset and the second phase offset are determined based on a frequency domain position of the first segment, a bandwidth value of the first segment, a frequency domain position of the second segment, and a bandwidth value of the second segment.

Further, a frequency corresponding to an end position of the first segment is lower than a frequency corresponding to a start position of the second segment, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

$-M_1+x$ is the first phase offset, $M_2+x$ is the second phase offset, k is an index of a subcarrier in the resource grid, $N_{grid}^{size}$ is a quantity of subcarriers included in the at least two resource sets, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, $a_{k,l}$ represents the to-be-transmitted signal that is mapped to a symbol whose index is l and to a subcarrier whose index is k in the resource grid, $k_0$ represents a subcarrier-level offset, t represents anytime in a time unit, $\Delta f$ represents a subcarrier spacing, $T_l$ is determined based on a time domain position of the symbol, l is an integer greater than or equal to 0, both $\Delta f$ and T, are greater than 0, $k_0$ is areal number, an absolute value of $M_1$ is a quantity of subcarriers included in a frequency domain resource between a configured frequency position and the end position of the first segment, and an absolute value of $M_2$ is a quantity of subcarriers included in a frequency domain resource between the configured frequency position and the start position of the second segment.

In an embodiment, the configured frequency position may be predefined or configured by the network device in real time.

In an embodiment, the configured frequency position is a center frequency position between a start position of the first segment and an end position of the second segment.

In an embodiment, the $N_{grid,1}^{size}$ subcarriers correspond to the first segment in the virtual carrier, and the $N_{grid,2}^{size}$ subcarriers correspond to the second segment in the virtual carrier. A summation upper bound of the first summation item and a summation lower bound of the second summation item are determined based on bandwidth of the virtual carrier and positions of the first segment and the second segment in frequency domain.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and
the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}-M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is areal number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment.

In an embodiment, the configured frequency position may be predefined or configured by the network device in real time.

In an embodiment, the configured frequency position is a center frequency position between a start position of the first downlink virtual carrier and an end position of the second downlink virtual carrier.

With reference to the fifth aspect, in an embodiment, when the transmit end is a network device, the method may further include:

The network device sends resource configuration information to a terminal, where the resource configuration information is used to indicate the start position of the first segment and the start position of the second segment.

With reference to the fifth aspect, in an embodiment, the resource configuration information includes a first offset and a second offset, the first offset is an offset of a frequency domain resource at the start position of the first segment relative to a reference point, and the second offset is an offset of a frequency domain resource at the start position of the second segment relative to the reference point or an offset of a frequency domain resource at the start position of the second segment relative to the end position of the first segment.

Therefore, the terminal may determine the start positions of the first segment and the second segment in frequency domain based on the resource configuration information.

With reference to the fifth aspect, in an embodiment, the at least two resource sets further include a third resource set, the third resource set corresponds to a third segment in the virtual carrier, the resource configuration information further includes a third offset, the third offset is an offset of a frequency domain resource at a start position of the third segment relative to the reference point, or an offset of a frequency domain resource at a start position of the third segment relative to the end position of the first segment, or an offset of a frequency domain resource at a start position of the third segment relative to the end position of the second segment.

With reference to the fifth aspect, in an embodiment, the resource configuration information includes a first carrier index and a second carrier index, the first carrier index is an index of a common resource block corresponding to the start position of the first segment, and the second carrier index is an index of a common resource block corresponding to the start position of the second segment.

With reference to the fifth aspect, in an embodiment, the resource configuration information includes a first carrier index, a second carrier index, and a third offset, the first carrier index is an index of a common resource block corresponding to the start position of the first segment, and the second carrier index and the third offset are used to determine the start position of the second segment.

According to a sixth aspect, a communication method is provided. The method includes: A receive end determines a resource grid on a virtual carrier based on at least two resource sets constituting one virtual carrier, where a quantity of subcarriers included in the at least two resource sets is equal to a quantity of subcarriers included in the resource grid, each resource set includes at least one subcarrier, and when the at least one subcarrier is a plurality of subcarriers, the at least one subcarrier is contiguous in frequency domain. The receive end receives an OFDM baseband signal based on the determined resource grid.

Therefore, according to the communication method in an embodiment of the application, a plurality of discrete spectrum resources or non-standard bandwidth spectrum resources may be aggregated by using one virtual carrier, to enable efficient communication on a discrete spectrum or anon-standard bandwidth spectrum. In addition, a relatively long OFDM baseband signal is generated on the virtual carrier. This helps reduce a peak to average power ratio (peak to average power ratio, PAPR), and reduce spectrum spreading interference and in-band signal distortion, and this also helps suppress noise interference, thereby obtaining better transmission quality.

For a characteristic and a form of the OFDM baseband signal, refer to the description in the fifth aspect. Details are not described herein again.

With reference to the sixth aspect, in an embodiment, when the receive end is a terminal, the method may further include: The terminal receives the resource configuration information sent by the network device and determines the start position of the first segment and the start position of the second segment based on the resource configuration information.

With reference to the sixth aspect, in an embodiment, the resource configuration information includes a first offset and a second offset, the first offset is an offset of a frequency domain resource at the start position of the first segment relative to a reference point, and the second offset is an offset of a frequency domain resource at the start position of the second segment relative to the reference point or an offset of a frequency domain resource at the start position of the second segment relative to the end position of the first segment.

Therefore, the terminal may determine the start positions of the first segment and the second segment in frequency domain based on the resource configuration information.

With reference to the sixth aspect, in an embodiment, the at least two resource sets further include a third resource set, the third resource set corresponds to a third segment in the virtual carrier, the resource configuration information further includes a third offset, the third offset is an offset of a frequency domain resource at a start position of the third segment relative to the reference point, or an offset of a frequency domain resource at a start position of the third segment relative to the end position of the first segment, or an offset of a frequency domain resource at a start position of the third segment relative to the end position of the second segment.

With reference to the sixth aspect, in an embodiment, the resource configuration information includes a first carrier index and a second carrier index, the first carrier index is an index of a common resource block corresponding to the start position of the first segment, and the second carrier index is an index of a common resource block corresponding to the start position of the second segment.

With reference to the sixth aspect, in an embodiment, the resource configuration information includes a first carrier index, a second carrier index, and a third offset, the first carrier index is an index of a common resource block corresponding to the start position of the first segment, and the second carrier index and the third offset are used to determine the start position of the second segment.

According to a seventh aspect, a communications apparatus is provided. The apparatus includes units configured to perform the operations in any one of the first aspect to the sixth aspect or the embodiments of the first aspect to the sixth aspect.

In a design, the apparatus is a communications chip. The communications chip may include an input circuit or interface configured to send information or data, and an output circuit or interface configured to receive information or data.

In another design, the apparatus is a terminal. The terminal may include a transmitter configured to send information or data, and a receiver configured to receive information or data.

In still another design, the apparatus is a network device. The network device may include a transmitter configured to send information or data, and a receiver configured to receive information or data.

According to an eighth aspect, a communications device is provided. The device includes a processor and a memory. The memory is configured to store a computer program. The processor is configured to invoke the computer program from the memory and run the computer program, so that the communications device performs the method according to any one of the first aspect to the sixth aspect or the implementations of the first aspect to the sixth aspect.

In an embodiment, there are one or more processors and one or more memories.

In an embodiment, the memory may be integrated into the processor, or the memory and the processor may be separately disposed.

In an embodiment, the communications device further includes a transmitter (transmitter) and a receiver (receiver).

According to a ninth aspect, a computer program product is provided. The computer program product includes a computer program (which may also be referred to as code or an instruction). When the computer program is run, a computer is enabled to perform the method according to any one of the embodiments of the first aspect to the sixth aspect.

According to a tenth aspect, a computer-readable medium is provided. The computer-readable medium stores a computer program (which may also be referred to as code or an instruction). When the computer program is run on a computer, the computer is enabled to perform the method according to any one of the embodiments of the first aspect to the sixth aspect.

According to an eleventh aspect, a chip system is provided. The chip system includes a memory and a processor. The memory is configured to store a computer program. The processor is configured to invoke the computer program from the memory and run the computer program, so that a communications device on which the chip system is installed performs the method according to any one of the embodiments of the first aspect to the sixth aspect.

The chip system may include an input circuit or interface configured to send information or data, and an output circuit or interface configured to receive information or data.

DESCRIPTION OF EMBODIMENTS

Figure 1:
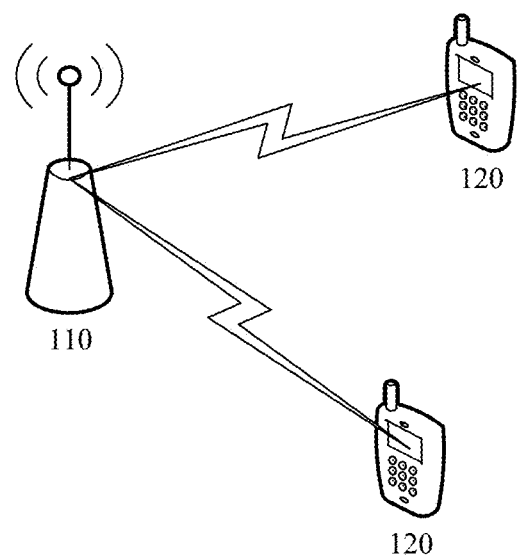
FIG. 1 is a schematic diagram of a communications system according to an embodiment of the application.

The following describes the technical solutions of the application with reference to the accompanying drawings.

The technical solutions of the embodiments of the application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, a LTE time division duplex (TDD) system, a universal mobile telecommunications system (UMTS), a worldwide interoperability for microwave access (WiMAX) communications system, a 5th generation (5G) system, or a new radio (NR) system.

A terminal in the embodiments of the application may also be referred to as user equipment (UE), a terminal device, an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, or a terminal in a future evolved public land mobile communications network (PLMN). This is not limited in the embodiments of the application.

A network device in the embodiments of the application may be a device configured to communicate with the terminal. The network device may be a base transceiver station (BTS) in global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay station, an access point, a vehicle-mounted device, a wearable device, a network device in a future 5G network, a network device in a future evolved PLMN network, or the like. This is not limited in the embodiments of the application.

The following first briefly describes some concepts or terms used in the application.

1. Carrier Bandwidth Part (BWP)

In 5G NR, that data transmission between a network device and a terminal is performed in a two-step resource allocation manner is discussed and supported. To be specific, the network device first allocates a BWP to the terminal, then allocates a resource to the terminal in the BWP, and transmits data by allocating the resource to the terminal. In the following descriptions, unless otherwise specified, transmission may refer to both uplink sending and downlink receiving.

For example, that the network device allocates a BWP to the terminal may be applied to any one or any combination of the following three scenarios.

Scenario 1: High-Bandwidth Scenario

In a communications system, as a service volume of the terminal increases and a quantity of terminals increases, a service volume of a system significantly increases. Therefore, a design in which system bandwidth is high bandwidth is put forward in an existing communications system, to provide a relatively large quantity of system resources, so that a relatively high data transmission rate can be provided. In a communications system in which system bandwidth is high bandwidth, considering costs of the terminal and a service volume of the terminal, bandwidth supported by the terminal may be lower than the system bandwidth. Higher bandwidth supported by the terminal indicates a stronger processing capability of the terminal, and may indicate a higher data transmission rate of the terminal and higher design costs of the terminal. The bandwidth supported by the terminal may also be referred to as a bandwidth capability of the terminal. For example, in a 5G system, maximum system bandwidth may be 400 MHz, and a bandwidth capability of the terminal may be 20 MHz, 50 MHz, 100 MHz, or the like. In a wireless communications system, bandwidth capabilities of different terminals may be the same or different. This is not limited in the embodiments of the application.

In a communications system in which system bandwidth is high bandwidth, because a bandwidth capability of the terminal is lower than the system bandwidth, the network device may configure a BWP for the terminal from a system frequency resource, and bandwidth of the BWP is lower than or equal to the bandwidth capability of the terminal. When the terminal communicates with the network device, the network device may allocate, to the terminal, some or all resources in the BWP configured for the terminal, to perform communication between the network device and the terminal.

Scenario 2: Multi-Parameter-Set (Numerology) Scenario

In a wireless communications system, for example, in a 5G system, to support more service types and/or communications scenarios, a design in which a plurality of parameter sets are supported is put forward. Parameter sets may be independently set for different service types and/or communications scenarios.

In a possible configuration, the network device may configure a plurality of BWPs in a system frequency resource, and independently configure a parameter set for each of the plurality of BWPs, to support a plurality of service types and/or communication scenarios in the system frequency resource. Parameter sets of different BWPs may be the same or may be different. This is not limited in the application.

When the terminal communicates with the network device, the network device may determine, based on a service type and/or a communication scenario corresponding to the communication, a parameter set A used for communication, to configure a corresponding BWP for the terminal based on the parameter set A. A parameter set of the corresponding BWP is configured as the parameter set A. When the terminal communicates with the network device, the network device may allocate, to the terminal, some or all resources in the BWP configured for the terminal, to perform communication between the network device and the terminal.

Scenario 3: Bandwidth Fallback

When the terminal communicates with the network device, the network device may configure a BWP for the terminal based on a service volume of the terminal, to reduce power consumption of the terminal. For example, if the terminal has no service, the terminal may receive control information only in a relatively small BWP, so that a radio frequency processing workload and a baseband processing workload of the terminal can be reduced, thereby reducing power consumption of the terminal. If the terminal has a relatively small service volume, the network device may configure a BWP with relatively low bandwidth for the terminal, so that the radio frequency processing workload and the baseband processing workload of the terminal can be reduced, thereby reducing power consumption of the terminal. If the terminal has a relatively large service volume, the network device may configure a BWP with relatively high bandwidth for the terminal, to provide a higher data transmission rate. When the terminal communicates with the network device, the network device may allocate, to the terminal, some or all resources in the BWP configured for the terminal, to perform communication between the network device and the terminal.

For example, the BWP may be a downlink BWP, and is used by the terminal for downlink receiving. In this case, bandwidth of the BWP does not exceed a bandwidth receiving capability of the terminal. Alternatively, the BWP may be an uplink BWP, and is used by the terminal for uplink sending. In this case, bandwidth of the BWP does not exceed a bandwidth sending capability of the terminal.

When the network device and the terminal perform wireless communication by using a BWP, the network device manages a system frequency resource, and allocates a BWP from the system frequency resource to the terminal, so that the network device and the terminal can communicate with each other by using the allocated BWP. The system frequency resource may be a frequency resource that can be managed and allocated by the network device, or may be a frequency resource that can be used for communication between the network device and the terminal. In the embodiments of the application, the system frequency resource may also be referred to as a carrier resource, a system resource, or a transmission resource. In frequency domain, a width of the system frequency resource may be referred to as bandwidth of the system frequency resource, carrier bandwidth, system bandwidth, or transmission bandwidth.

The BWP is a self-contained structure. To be specific, the terminal does not expect to perform downlink receiving outside the downlink BWP, and does not expect to perform uplink sending outside the uplink BWP.

For example, one BWP may include K (K>0) contiguous subcarriers. Alternatively, one BWP is a frequency domain resource on which N non-overlapping consecutive resource blocks (resource block, RB) are located, and a subcarrier spacing of the RB may be 15 kHz, 30 kHz, 60 kHz, 120 kHz, 240 kHz, 480 kHz, or another value. Alternatively, one BWP is a frequency domain resource on which M non-overlapping consecutive resource block groups (resource block group, RBG) are located, and one RBG includes P consecutive RBs, and a subcarrier spacing of the RB may be 15 kHz, 30 kHz, 60 kHz, 120 kHz, 240 kHz, 480 kHz, or another value, for example, an integer multiple of 2.

2. Parameter Set (Numerology)

The parameter set is a parameter used by a communications system. The communications system (for example, 5G) may support a plurality of parameter sets. The parameter set may be defined by using one or more of the following parameter information: a subcarrier spacing, a cyclic prefix (cyclic prefix, CP), a time unit, bandwidth, or the like. For example, the parameter set may be defined by a subcarrier spacing and a CP.

The subcarrier spacing may be an integer greater than or equal to 0. For example, the subcarrier spacing may be 15 kHz, 30 kHz, 60 kHz, 120 kHz, 240 kHz, 480 kHz, or the like. It may be understood that the subcarrier spacing may alternatively be designed to be another value. This is not limited in the embodiments of the application.

CP information may include a CP length and/or a CP type. For example, the CP may be a normal CP (normal CP, NCP) or an extended CP (extended CP, ECP).

The time unit is used to represent a time unit in time domain, for example, may be a sampling point, a symbol, a mini-slot, a slot, a subframe, or a radio frame. Time unit information may include a type, a length, a structure, or the like of a time unit.

The bandwidth may be resources that are consecutive in frequency domain. Sometimes, the bandwidth may be referred to as a bandwidth part (BWP), a carrier bandwidth part (carrier bandwidth part), subband bandwidth, narrowband (narrowband) bandwidth, or another name. The name is not limited in the application.

3. Virtual Carrier

The virtual carrier may also be referred to as a logical carrier, a terminal-specific carrier, an available resource block (RB), available bandwidth, or the like. The terminal needs to determine a resource grid and an orthogonal frequency division multiplexing (OFDM) baseband signal based on the virtual carrier, place a radio frequency (RF) transceiver, and/or perform filtering.

4. Resource Grid

The resource grid is defined within virtual carrier bandwidth. In a wireless communications system, for example, in an OFDM-based communications system, one resource grid includes X1 subcarriers in frequency domain. X1 is an integer greater than or equal to 1. For example, X1 is a multiple of 12. Generally, the X1 subcarriers may be numbered in a frequency increasing direction. In time domain, one resource grid includes X2 symbols. X2 is an integer greater than or equal to 1. For example, X2 is 7 or 14. Generally, the X2 symbols may be numbered in a time domain increasing direction. In the resource grid, one subcarrier and one symbol uniquely determine one resource element (resource element, RE), that is, (k, l), where k represents a subcarrier index, and l represents a symbol index. A complex number transmitted by using the resource element (k, l) is denoted as $a_{k,l}$. In the embodiments of the application, the term "index" may also be referred to as an "identifier" or a "number value".

For ease of understanding the embodiments of the application, a communications system applicable to the embodiments of the application is first briefly described with reference to FIG. 1. FIG. 1 is a schematic diagram of a communications system 100 applicable to a resource configuration method and a communication method according to an embodiment of the application. As shown in FIG. 1, the communications system 100 includes at least two communications devices, for example, a network device 110 and a terminal 120. Data communication may be performed between the network device 110 and the terminal 120 through a wireless connection.

An operator has many noncontiguous spectrums in a low frequency band, and a segment of bandwidth, for example, 7.5 MHz bandwidth, with consecutive frequency domain resources in the noncontiguous spectrums may be nonstandard. How to efficiently use these discrete spectrums and/or non-standard bandwidth spectrums to improve throughputs of the network device and the terminal is a problem that needs to be resolved in 5G NR.

In view of this, the application provides a resource configuration method, to improve throughputs of a network device and a terminal by efficiently using a discrete spectrum and/or a non-standard bandwidth spectrum. With reference to FIG. 2 to FIG. 10, the following describes in detail the resource configuration method provided in the application.

In the embodiments of the present disclosure, configuration and indication may have a same meaning or different meanings. For example, using an example in which the network device sends configuration information including a virtual carrier to the terminal, the configuration information may include a parameter, so that the terminal identifies the virtual carrier by using the parameter. A configuration behavior may be executed by the network device, or may be executed by the terminal. For another example, using an example in which the network device sends indication information including a virtual carrier to the terminal, the indication information may include an identifier or an index of the virtual carrier, so that the terminal identifies the virtual carrier by using the identifier or the index. A person skilled in the art may understand that the foregoing parameter, identifier, or index may be used interchangeably, provided that a receive end can identify information.

Figure 2:
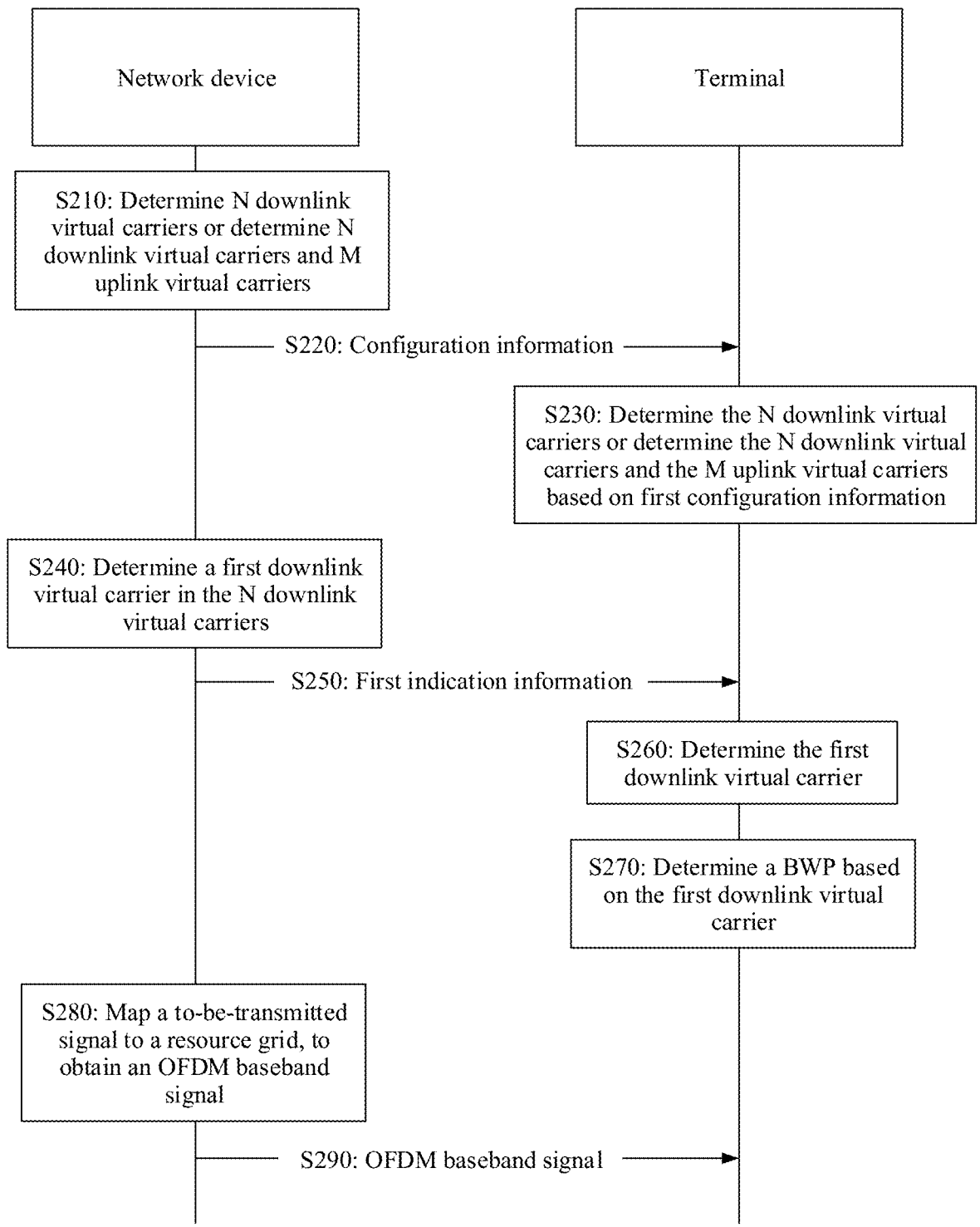
FIG. 2 is a schematic flowchart of a resource configuration method according to an embodiment of the application.

FIG. 2 is a schematic flowchart of a resource configuration method according to an embodiment of the application. It should be understood that the network device in the method shown in FIG. 2 may correspond to the network device in the system 100 shown in FIG. 1, and the terminal may correspond to any one of the terminals shown in FIG. 1.

S210: The network device determines N downlink virtual carriers or determines N downlink virtual carriers and M uplink virtual carriers. N≥M≥1, N>1, and both N and M are positive integers.

It should be understood that the downlink virtual carrier is a virtual carrier used for downlink transmission, and the uplink virtual carrier is a virtual carrier used for uplink transmission.

Specifically, the network device may configure a plurality of (for example, N) downlink virtual carriers with a same parameter set in one cell. Alternatively, the network device may configure a plurality of (for example, N) downlink virtual carriers with a same parameter set and one or more (for example, M) uplink virtual carriers with a same parameter set in one cell. In other words, the N downlink virtual carriers are configured in the same cell, or the N downlink virtual carriers and the M uplink virtual carriers are configured in the same cell. In addition, the N downlink virtual carriers correspond to the same parameter set, and the M uplink virtual carriers correspond to the same parameter set. For example, the N downlink virtual carriers correspond to a same subcarrier spacing, and the M uplink virtual carriers correspond to a same subcarrier spacing.

One cell may include one downlink carrier, and the downlink carrier may be contiguous or noncontiguous in frequency domain. The downlink carrier may be a plurality of consecutive spectrum resources of a discrete spectrum, or may be a contiguous spectrum of a segment of non-standard bandwidth. The network device may configure the N downlink virtual carriers on the downlink carrier.

Alternatively, one cell may include a plurality of downlink carriers, and the plurality of downlink carriers may be contiguous or noncontiguous in frequency domain and may or may not overlap in frequency domain. The plurality of downlink carriers may be a plurality of spectrum resources of a discrete spectrum, or may be a contiguous spectrum of a segment of non-standard bandwidth. The network device may configure at least one downlink virtual carrier on each of the plurality of downlink carriers.

One cell may include one uplink carrier, and the uplink carrier may be contiguous or noncontiguous in frequency domain. The uplink carrier may be a plurality of consecutive spectrum resources of a discrete spectrum, or may be a segment of non-standard contiguous bandwidth. The network device may configure the M uplink virtual carriers on the uplink carrier.

Alternatively, one cell may include a plurality of uplink carriers, and the plurality of uplink carriers may be contiguous or noncontiguous in frequency domain and may or may not overlap in frequency domain. The plurality of uplink carriers may be a plurality of spectrum resources of a discrete spectrum, or may be a contiguous spectrum of a segment of non-standard bandwidth. The network device may configure at least one uplink virtual carrier on each of the plurality of uplink carriers.

Relative positions of the N downlink virtual carriers in frequency domain are not limited in the application. For example, the N downlink virtual carriers may be contiguous or noncontiguous in frequency domain, and may or may not overlap in frequency domain. Relative positions of the M uplink virtual carriers in frequency domain are not limited in the application. For example, the M uplink virtual carriers may be contiguous or noncontiguous in frequency domain, and may or may not overlap in frequency domain. In addition, positions of the downlink virtual carriers relative to the uplink virtual carriers in frequency domain are not limited in the application. For example, a downlink virtual carrier and an uplink virtual carrier may or may not overlap in frequency domain.

Figure 3:
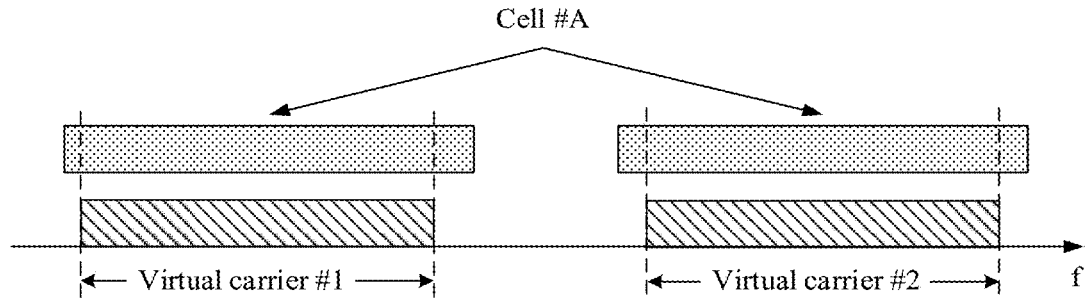
FIG. 3 is a schematic diagram of a virtual carrier according to an embodiment of the application.

For example, FIG. 3 is a schematic diagram of configuring two downlink virtual carriers in one cell. As shown in FIG. 3, one discrete spectrum resource includes a virtual carrier #1 and a virtual carrier #2. Bandwidth of the virtual carrier #1 and the virtual carrier #2 may be non-standard bandwidth, or may be standard bandwidth. This is not limited in this embodiment of the application. The virtual carrier #1 and the virtual carrier #2 are configured in a cell #A, and the virtual carrier #1 and the virtual carrier #2 are noncontiguous and do not overlap in frequency domain.

Figure 4:
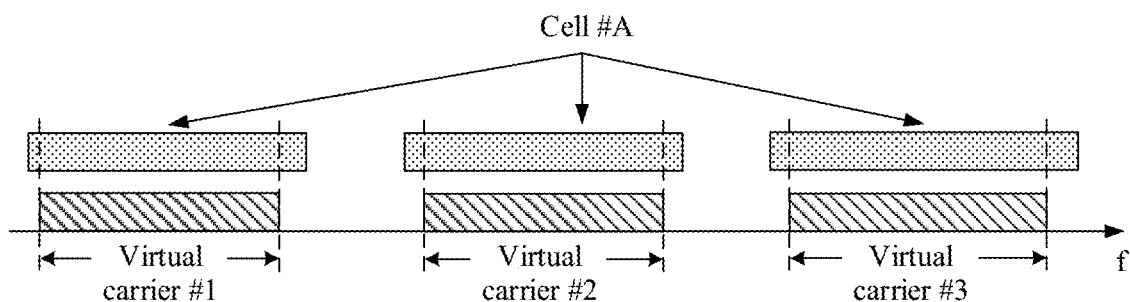
FIG. 4 is a schematic diagram of a virtual carrier according to an embodiment of the application.

For example, FIG. 4 is a schematic diagram of configuring two downlink virtual carriers and one uplink virtual carrier in one carrier. As shown in FIG. 4, one discrete spectrum resource includes a virtual carrier #1 to a virtual carrier #3. Any one of the virtual carrier #1 to the virtual carrier #3 may be non-standard bandwidth, or may be standard bandwidth. This is not limited in this embodiment of the application. The virtual carrier #1, the virtual carrier #2, and the virtual carrier #3 are configured in a cell #A, the virtual carrier #1 and the virtual carrier #2 are downlink virtual carriers, and the virtual carrier #1 and the virtual carrier #2 are noncontiguous and do not overlap in frequency domain. The virtual carrier #3 is an uplink virtual carrier, and the virtual carrier #3, the virtual carrier #1, and the virtual carrier #2 are noncontiguous and do not overlap.

It should be understood that a quantity of discrete spectrums or carriers included in one cell may be equal to or unequal to a quantity of virtual carriers configured in the carriers. This is not limited in this embodiment of the application.

In an embodiment, the method may further include: S220: The network device sends configuration information to the terminal. Correspondingly, the terminal receives the configuration information sent by the network device.

In an embodiment, the configuration information may be RRC signaling.

Further, the RRC signaling may be a system information block SIB, or may be terminal-specific RRC signaling. This is not limited in this embodiment of the application.

It should be understood that the configuration information may be carried by using one piece of signaling, or may be carried by using a plurality of pieces of signaling. For example, the configuration information may be carried by using one piece of RRC signaling, or may be carried by using a plurality of pieces of RRC signaling. For example, when the configuration information is carried by using the plurality of pieces of signaling, one piece of signaling may be used to configure the N downlink virtual carriers, or in other words, the signaling is used to carry configuration information of the N downlink virtual carriers, and another piece of signaling may be used to configure the M uplink virtual carriers. For example, one of the plurality of pieces of signaling may be used to configure at least one of the N downlink virtual carriers, or one of the plurality of pieces of signaling may be used to configure at least one of the M uplink virtual carriers, or one of the plurality of pieces of signaling may be used to configure at least one downlink virtual carrier and at least one uplink virtual carrier.

In an embodiment, the method may further include: S230: The terminal determines the N downlink virtual carriers or the N downlink virtual carriers and the M uplink virtual carriers based on the configuration information.

The configuration information is used to configure the N downlink virtual carriers or configure the N downlink virtual carriers and the M uplink virtual carriers. In other words, the configuration information is used by the terminal to determine the N downlink virtual carriers or determine the N downlink virtual carriers and the M uplink virtual carriers.

For example, the configuration information may include one or more of the following three types of information: bandwidth value information, frequency position information, and corresponding parameter set information of each downlink virtual carrier in the N downlink virtual carriers. Correspondingly, the terminal may determine, based on the configuration information, one or more of the following three types of information: a bandwidth value, a frequency position, and a corresponding parameter set of each downlink virtual carrier. Alternatively, the configuration information may include one or more of the following three types of information: bandwidth value information, frequency position information, and corresponding parameter set information of each downlink virtual carrier in the N downlink virtual carriers, and include one or more of the following three types of information: bandwidth value information, frequency position information, and corresponding parameter set information of each uplink virtual carrier in the M uplink virtual carriers. Correspondingly, the terminal may determine, based on the configuration information, one or more of the following three types of information: a bandwidth value, a frequency position, and a corresponding parameter set of each downlink virtual carrier, and one or more of the following three types of information: a bandwidth value, a frequency position, and a corresponding parameter set of each uplink virtual carrier.

According to the resource configuration method in an embodiment of the application, some discrete spectrums and/or non-standard bandwidth spectrums may be aggregated into one cell, and a plurality of virtual carriers, for example, the N downlink virtual carriers or the N downlink virtual carriers and the M uplink virtual carriers, with a same parameter set are configured in the cell, to enable the terminal to work on these discrete spectrums and/or non-standard bandwidth spectrums. In this way, throughputs of the network device and the terminal can be improved by efficiently using the discrete spectrums and/or the non-standard bandwidth spectrums. Specifically, for the network device, the plurality of virtual carriers with the same parameter set are configured in the cell, so that scheduling flexibility can be improved, and load balancing is facilitated. For the terminal, the plurality of virtual carriers with the same parameter set are configured in the cell, so that complexity of the terminal can be reduced, and a peak rate of a service with a single subcarrier spacing can be effectively increased.

It may be understood that any operation in S210 to S230 may be separately used as a different embodiment. For example, for the network device, the network device may determine a plurality of virtual carriers by using S210 and/or S220, and further determine characteristics of the plurality of virtual carriers (for example, the plurality of virtual carriers are based on one cell and have a same subcarrier spacing). For the terminal, the foregoing information may alternatively be obtained by using S230.

It should be noted that, in the application, S210 may not be performed, but S220 and/or S230 are/is performed. In other words, the network device may not perform a determining operation, but directly send the configuration information to the terminal.

In an embodiment of the application, the network device may further configure, by using the configuration information or another piece of signaling, a category or an interference level of a subcarrier between two noncontiguous virtual carriers in frequency domain. For example, the network device may configure that subcarriers between the virtual carrier #1 and the virtual carrier #2 shown in FIG. 3 include a first-type subcarrier and a second-type subcarrier. The first-type subcarrier is a subcarrier with a high interference level, and the terminal needs to perform interference isolation through radio frequency filtering. The second-type subcarrier is a subcarrier with a low interference level, and the terminal may perform interference isolation through baseband filtering.

The following describes in detail how to configure a start position of a virtual carrier in frequency domain by using an example of configuring the start position of the virtual carrier in frequency domain. It should be understood that a manner of configuring a start position described below may also be applied to configuration of an end position or any other position.

First, a manner in which the network device configures a start position of the downlink virtual carrier is described. It should be noted that, in the embodiments described below, the N downlink virtual carriers have an equal subcarrier spacing, and the M uplink virtual carriers have an equal subcarrier spacing.

In an embodiment, the network device may use a reference point as a common reference position of at least two virtual carriers in the N downlink virtual carriers, and configure start positions of the at least two downlink virtual carriers by configuring offsets of the start positions of the at least two downlink virtual carriers relative to the reference point.

Alternatively, the network device may use the reference point as a reference position of a downlink virtual carrier (for example, denoted as a reference downlink virtual carrier), and configure a start position of the reference downlink virtual carrier by configuring an offset of the start position of the reference downlink virtual carrier relative to the reference point, and use an end position of the reference downlink virtual carrier as a reference position of each of downlink virtual carriers other than the reference downlink virtual carrier, and configure a start position of each of the downlink virtual carriers other than the reference downlink virtual carrier by configuring an offset of the start position of each of the downlink virtual carriers other than the reference downlink virtual carrier relative to the end position of the reference downlink virtual carrier.

Alternatively, the network device may configure a start position of each downlink virtual carrier by configuring an offset of the start position of each downlink virtual carrier relative to a reference position corresponding to the downlink virtual carrier. In other words, there are N reference positions, and the N reference positions are in a one-to-one correspondence with the N downlink virtual carriers.

For example, the network device may use the reference point as a reference position of the first downlink virtual carrier, and configure a start position of the first downlink virtual carrier by configuring an offset of the start position of the first downlink virtual carrier relative to the reference point, use an end position of the first downlink virtual carrier as a reference position of the second downlink virtual carrier, and configure a start position of the second downlink virtual carrier by configuring an offset of the start position of the second downlink virtual carrier relative to the end position of the first downlink virtual carrier. The rest can be deduced by analogy. To be specific, the network device may use an end position of the second downlink virtual carrier as a reference position of the third downlink virtual carrier, and configure a start position of the third downlink virtual carrier by configuring an offset of the start position of the third downlink virtual carrier relative to the end position of the second downlink virtual carrier. If there is still a fourth downlink virtual carrier, configuration is performed by using a similar configuration method, and examples are not described one by one herein. It should be understood that frequencies corresponding to start positions of the first downlink virtual carrier, the second downlink virtual carrier, and the like in frequency domain sequentially increase or decrease.

For example, using an example in which the N downlink virtual carriers include the first downlink virtual carrier and the second downlink virtual carrier, a first offset Ost 1 and a second offset Ost 2 may be carried in the configuration information, to configure start positions of the first downlink virtual carrier and the second downlink virtual carrier on a frequency domain resource. Herein, the first offset Ost 1 is an offset of a frequency domain resource at the start position of the first downlink virtual carrier relative to the reference point. The second offset Ost 2 is an offset of a frequency domain resource at the start position of the second downlink virtual carrier relative to the reference point or an offset of a frequency domain resource at the start position of the second downlink virtual carrier relative to an end position of the first downlink virtual carrier. Therefore, the start position of the first downlink virtual carrier in frequency domain may be determined based on the first offset Ost 1, and the start position of the second downlink virtual carrier in frequency domain may be determined based on the second offset Ost 2.

In an example, the first offset Ost 1 is A1 resource blocks, and the second offset Ost 2 is B1 resource blocks. A1 and B1 are both integers greater than or equal to 0.

Figure 5:
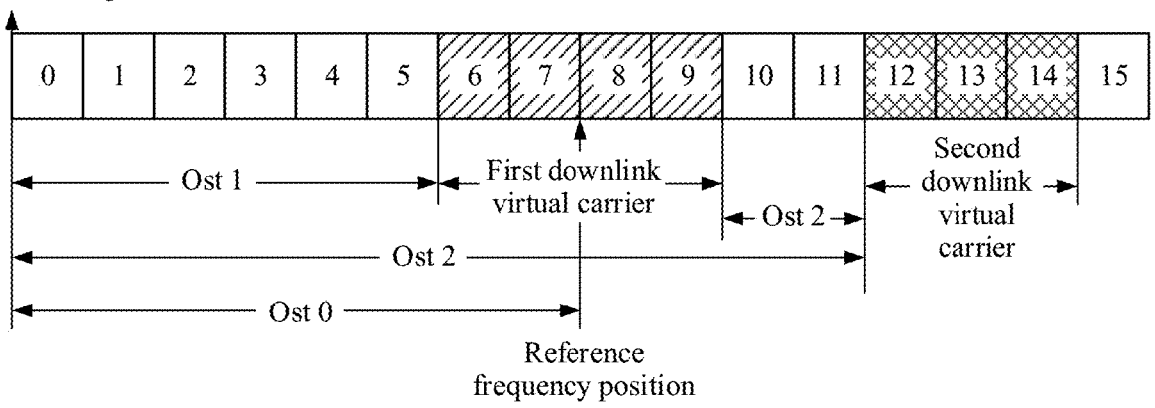
FIG. 5 is a schematic diagram of a start position at which a virtual carrier is configured according to an embodiment of the application.

FIG. 5 is a schematic diagram of a virtual carrier configuration. As shown in FIG. 5, a reference point may be determined based on an offset Ost 0 between the reference point and a reference frequency position. After the reference point is determined, a common resource block may be determined based on a subcarrier spacing of a first downlink virtual carrier or the second downlink virtual carrier. Based on a first offset Ost 1=6 RBs, it may be learned that the start position of the first downlink virtual carrier is a common resource block whose index is 6. If the second offset Ost 2 is the offset of the frequency domain resource at the start position of the second downlink virtual carrier relative to the end position of the first downlink virtual carrier, it may be determined, based on the second offset Ost 2=2 RBs, that the start position of the second downlink virtual carrier is a common resource block whose index is 12. If the second offset Ost 2 is the offset of the frequency domain resource at the start position of the second downlink virtual carrier relative to the reference point, it may be determined, based on the second offset Ost 2=12 RBs, that the start position of the second downlink virtual carrier is a common resource block whose index is 12.

In another example, the first offset Ost 1 is A1 resource blocks, and the second offset Ost 2 includes B1 subcarriers. A1 and B1 are both integers greater than or equal to 0.

Figure 6:
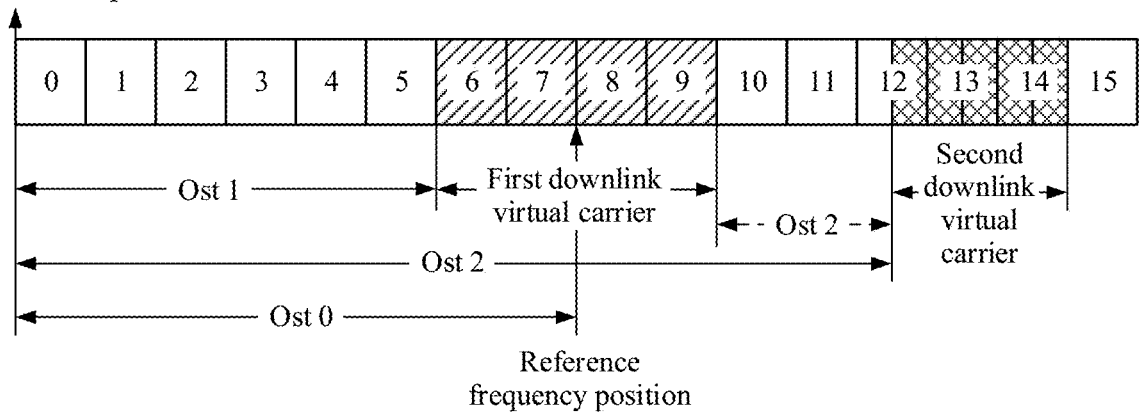
FIG. 6 is a schematic diagram of a start position at which a virtual carrier is configured according to an embodiment of the application.

FIG. 6 is a schematic diagram of a virtual carrier configuration. A reference frequency position and a reference point shown in FIG. 6 are the same as those in FIG. 5. As shown in FIG. 6, based on the first offset Ost 1=6 RBs, it may be learned that the start position of the first downlink virtual carrier is a common resource block whose index is 6. If the second offset Ost 2 is the offset of the frequency domain resource at the start position of the second downlink virtual carrier relative to the end position of the first downlink virtual carrier, it may be determined, based on the second offset Ost 2=2 RBs+6 subcarriers (that is, B1=6) or Ost 2=30 subcarriers (that is, B1=30), the start position of the second downlink virtual carrier shown in FIG. 6. If the second offset Ost 2 is the offset of the frequency domain resource at the start position of the second downlink virtual carrier relative to reference point, it may be determined, based on the second offset Ost 2=12 RBs+6 subcarriers (that is, B1=6) or Ost 2=150 subcarriers (that is, B1=150), the start position of the second downlink virtual carrier shown in FIG. 6.

In another example, the first offset Ost 1 includes A2 subcarriers, and the second offset Ost 2 is B2 resource blocks. A2 and B2 are both integers greater than or equal to 0.

Figure 7:
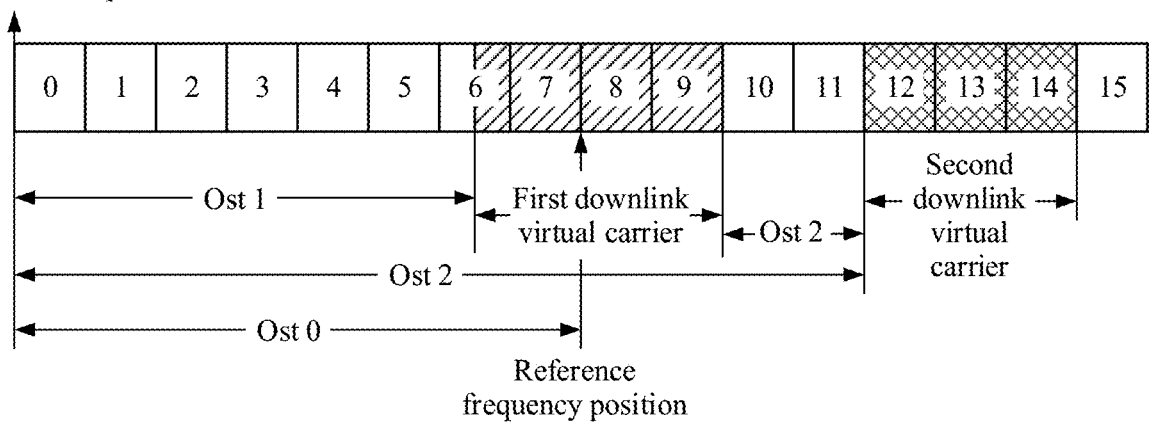
FIG. 7 is a schematic diagram of a start position at which a virtual carrier is configured according to an embodiment of the application.
Figure 8:
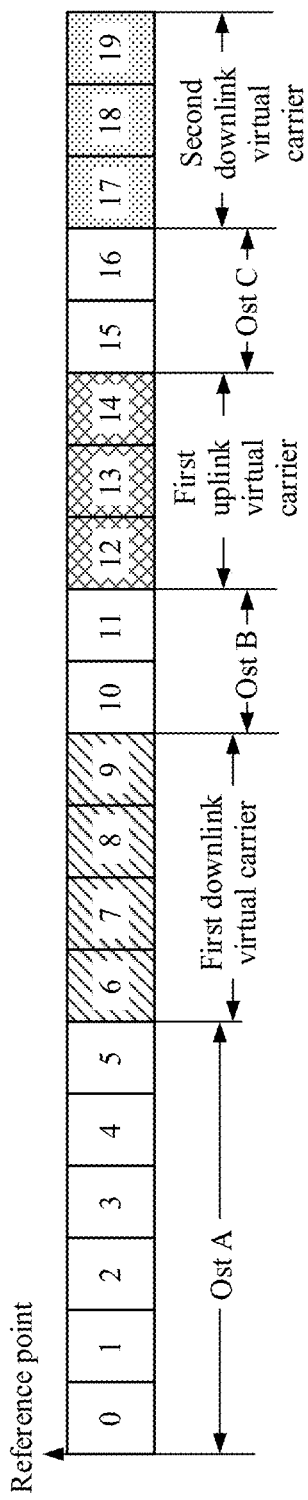
FIG. 8 is a schematic diagram of a start position at which a virtual carrier is configured according to an embodiment of the application.
Figure 9:
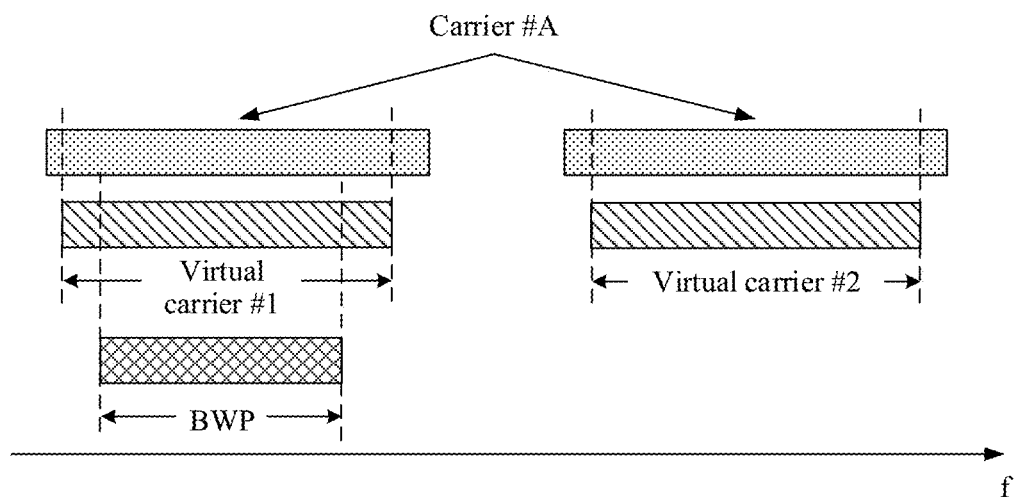
FIG. 9 is a schematic diagram of a BWP configured on a virtual carrier according to an embodiment of the application.
Figure 10:
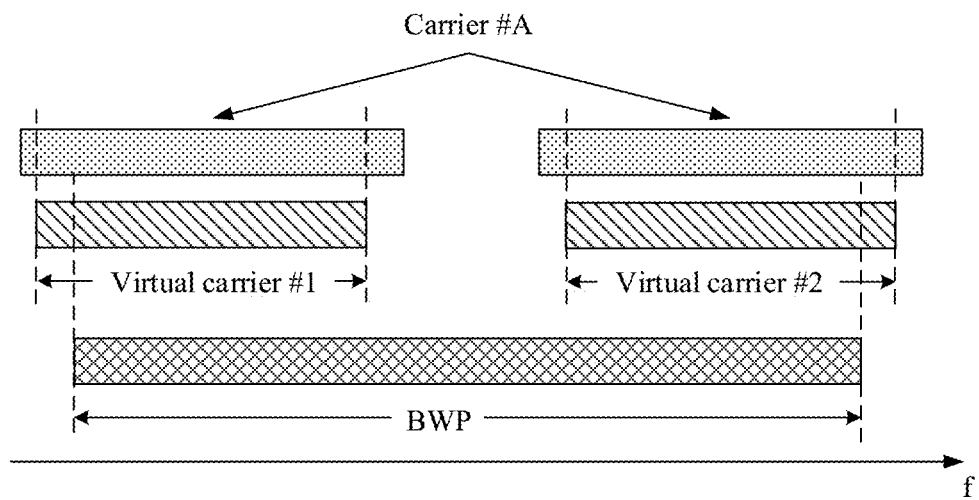
FIG. 10 is a schematic diagram of a BWP configured on a virtual carrier according to an embodiment of the application.

FIG. 7 is a schematic diagram of a virtual carrier configuration. A reference frequency position and a reference point shown in FIG. 7 are the same as those in FIG. 5. As shown in FIG. 7, the terminal may learn of the start position of the first downlink virtual carrier based on the first offset Ost 1=6 RBs+6 subcarriers (that is, A2=6) or Ost 1=78 subcarriers (that is, A2=78). If the second offset Ost 2 is the offset of the frequency domain resource at the start position of the second downlink virtual carrier relative to the end position of the first downlink virtual carrier, it may be determined, based on the second offset Ost 2=2 RBs, that the start position of the second downlink virtual carrier is a common resource block whose index is 12. If the second offset Ost 2 is the offset of the frequency domain resource at the start position of the second downlink virtual carrier relative to the reference point, it may be determined, based on the second offset Ost 2=12 RBs, that the start position of the second downlink virtual carrier is a common resource block whose index is 12.

Further, when the N downlink virtual carriers further include a third downlink virtual carrier, the configuration information may further carry a third offset, and a start position of the third downlink virtual carrier is indicated by using the third offset. The third offset is an offset of a frequency domain resource at a start position of the third downlink virtual carrier relative to the reference point, or an offset of a frequency domain resource at a start position of the third downlink virtual carrier relative to the end position of the second downlink virtual carrier, or an offset of a frequency domain resource at the start position of the third downlink virtual carrier relative to the end position of the first downlink virtual carrier. For example, the third offset may be several RBs or several subcarriers.

In addition, the network device may not configure the second offset. In other words, the configuration information may not include the second offset. In this case, the terminal assumes that an index of a start common resource block of the second downlink virtual carrier is an index of an end common resource block of the first downlink virtual carrier plus 1. In other words, the terminal considers that an index of a common resource block corresponding to the start position of the second downlink virtual carrier in frequency domain is an index of a common resource block corresponding to the start position of the first downlink virtual carrier in frequency domain plus 1.

Generally, the common resource blocks (resource block, RB) are numbered from an index 0 in a frequency increasing direction, and the reference point is a start position, in frequency domain, of a common resource block whose index is 0. Indexes of the common resource blocks may alternatively start from 1. This is not limited in this embodiment of the application. It should be understood that different subcarrier spacings correspond to different common resource block indexes. The reference point may be directly indicated by the network device. For example, the network device may send indication information to the terminal through higher layer signaling or physical layer signaling, and the indication information is used to indicate the reference point. It should be understood that the higher layer signaling may be RRC signaling, a media access control control element (MAC CE), or the like. Alternatively, the reference point may be determined based on an offset Ost 0 between the reference point and a reference frequency position. The offset Ost 0 may be predefined, or may be configured by the network device. This is not limited in this embodiment of the application. For example, for a downlink carrier of a primary cell, the reference frequency position is determined based on an RB with a lowest frequency in synchronization signal blocks accessed by the terminal. For an uplink carrier of a primary cell on a non-paired spectrum, the reference frequency position is determined based on an RB with a lowest frequency in synchronization signal blocks accessed by UE. For an uplink carrier of a primary cell on a paired spectrum, the reference frequency position is determined based on a frequency position configured by a base station, and the frequency position may correspond to an absolute radio frequency channel number (ARFCN). For a secondary cell, the reference frequency position is determined based on a frequency position configured by a base station, and the frequency position may correspond to an ARFCN. For a supplemental uplink carrier, the reference frequency position is determined based on a frequency position configured by a base station, and the frequency position may correspond to an ARFCN.

In another embodiment, the network device may configure a start position of each downlink virtual carrier by configuring an index of a common resource block corresponding to the start position of each downlink virtual carrier in the N downlink virtual carriers. Alternatively, a start position of each downlink virtual carrier is jointly indicated by using an index and an offset of a common resource block. Common resource blocks corresponding to the start positions of the downlink virtual carriers in the N downlink virtual carriers have a same reference point. The reference point may be the reference point described above. However, this is not limited in this embodiment of the application.

For example, using an example in which the N downlink virtual carriers include a first downlink virtual carrier and a second downlink virtual carrier, a first index and a second index may be carried in the configuration information, to configure start positions of the first downlink virtual carrier and the second downlink virtual carrier on a frequency domain resource.

The first index is an index of a common resource block corresponding to a start position of the first downlink virtual carrier, and the second index is an index of a common resource block corresponding to a start position of the second downlink virtual carrier. Therefore, the start position of the first downlink virtual carrier in frequency domain may be determined based on the first index, and the start position of the second downlink virtual carrier in frequency domain may be determined based on the second index. For example, if the first index is 6 and the second index is 12, the first downlink virtual carrier and the second downlink virtual carrier shown in FIG. 5 may be determined.

For another example, similarly, using an example in which the N downlink virtual carriers include a first downlink virtual carrier and a second downlink virtual carrier, a first index, a second index, and a third offset may be carried in the configuration information, to configure start positions of the first downlink virtual carrier and the second downlink virtual carrier on a frequency domain resource.

The first index is an index of a common resource block corresponding to the start position of the first downlink virtual carrier, and the second index and the third offset are used to determine the start position of the second virtual carrier. For example, if the first index is 6, the second index is 12, and the third offset is six subcarriers, the first downlink virtual carrier and the second downlink virtual carrier shown in FIG. 6 may be determined.

Alternatively, the first index and the third offset are used to determine the start position of the first downlink virtual carrier, and the second index is an index of a common resource block corresponding to the start position of the second downlink virtual carrier. For example, if the first index is 6, the second index is 11, and the third offset is six subcarriers, the first downlink virtual carrier and the second downlink virtual carrier shown in FIG. 7 may be determined.

The foregoing mainly describes how to configure a position of a downlink virtual carrier in frequency domain. For an uplink virtual carrier, a start position of the uplink virtual carrier in frequency domain may be configured by using a similar method. For example, if M=1, the start position of the uplink virtual carrier may be configured by configuring an offset of a frequency domain resource at the start position of the uplink virtual carrier relative to a reference point. For another example, if M>1, the reference point may be used as a common reference position of the M uplink virtual carriers, and a start position of each uplink virtual carrier is configured by configuring an offset at the start position of each uplink virtual carrier relative to the reference point. Alternatively, the network device may use the reference point as a reference position of a uplink virtual carrier (for example, denoted as a reference uplink virtual carrier), and configure an offset of the reference uplink virtual carrier by configuring an offset of a start position of the reference uplink virtual carrier relative to the reference point, and use an end position of the reference uplink virtual carrier as a reference position of each of uplink virtual carriers other than the reference uplink virtual carrier, and configure a start position of each of the uplink virtual carriers other than the reference uplink virtual carrier by configuring an offset of the start position of each of the uplink virtual carriers other than the reference uplink virtual carrier relative to the end position of the reference uplink virtual carrier. Alternatively, the network device may configure a start position of each uplink virtual carrier by configuring an offset of the start position of each uplink virtual carrier relative to a reference position corresponding to the uplink virtual carrier. In other words, there are M reference positions, and the M reference positions are in a one-to-one correspondence with the M uplink virtual carriers. For example, the network device may use the reference point as a reference position of the first uplink virtual carrier, and configure a start position of the first uplink virtual carrier by configuring an offset of the start position of the first uplink virtual carrier relative to the reference point, use an end position of the first uplink virtual carrier as a reference position of the second uplink virtual carrier, and configure a start position of the second uplink virtual carrier by configuring an offset of the start position of the second uplink virtual carrier relative to the end position of the first uplink virtual carrier. The rest can be deduced by analogy. To be specific, the network device may use an end position of the second uplink virtual carrier as a reference position of the third uplink virtual carrier, and configure a start position of the third uplink virtual carrier by configuring an offset of the start position of the third uplink virtual carrier relative to the end position of the second uplink virtual carrier. If there is still a fourth uplink virtual carrier, configuration is performed by using a similar configuration method, and examples are not described one by one herein. It should be understood that frequencies corresponding to start positions of the first uplink virtual carrier, the second uplink virtual carrier, and the like in frequency domain successively increase or decrease. It should be understood that frequencies corresponding to start positions of the first uplink virtual carrier, the second uplink virtual carrier, and the like in frequency domain successively increase or decrease. In addition, the network device may configure a start position of each uplink virtual carrier by configuring an index of a common resource block corresponding to the start position of each uplink virtual carrier in the M uplink virtual carriers. Alternatively, a start position of each uplink virtual carrier is jointly indicated by using an index and an offset of a common resource block. For how to configure the start position of the uplink virtual carrier, refer to the embodiment of configuring the start position of the downlink virtual carrier described above, and details are not described herein again.

It should be understood that the reference point corresponding to the uplink virtual carrier may be the same as or different from the reference point corresponding to the downlink virtual carrier. This is not limited in this embodiment of the application.

In addition, when the position of the virtual carrier in frequency domain is configured, the uplink carrier and the downlink carrier may not be distinguished. For example, referring to FIG. 8, assuming that a subcarrier spacing of the downlink virtual carrier is equal to a subcarrier spacing of the uplink virtual carrier, it may be determined, by using the reference point as a reference position of the first downlink virtual carrier and by configuring an offset Ost A of the start position of the first downlink virtual carrier relative to the reference point to be equal to 6 RBs, that the start position of the first downlink virtual carrier is a common resource block whose index is 6. It may be determined, by using the end position of the first downlink virtual carrier as the reference position of the first uplink virtual carrier and by configuring an offset Ost B at the start position of the first uplink virtual carrier relative to the end position of the first downlink virtual carrier to be 2 RBs, that the start position of the first uplink virtual carrier is a common resource block whose index is 12. It may be determined, by using the end position of the first uplink virtual carrier as the reference position of the second downlink virtual carrier and by configuring an offset Ost C at the start position of the second downlink virtual carrier relative to the end position of the first uplink virtual carrier to be 2 RBs, that the start position of the second downlink virtual carrier is a common resource block whose index is 17.

In conclusion, according to the embodiments described above, a start position of each downlink virtual carrier or start positions of each downlink virtual carrier and each uplink virtual carrier in frequency domain may be determined. In addition, the configuration information may further include bandwidth value information of each virtual carrier in the N downlink virtual carriers, or include bandwidth value information of each downlink virtual carrier in the N downlink virtual carriers and bandwidth value information of each uplink virtual carrier in the M uplink virtual carriers. Therefore, a position (including a start position and an end position) of each downlink virtual carrier or positions of each downlink virtual carrier and each uplink virtual carrier in frequency domain may be determined based on the configuration information.

It should be understood that, in the application, the start position of the virtual carrier in frequency domain may not be configured, but the end position, the central position, or any position of the virtual carrier in frequency domain is configured in the foregoing manner of configuring the start position of the virtual carrier in frequency domain. For a configuration manner, refer to the foregoing descriptions. Details are not described herein again.

Optionally, in an embodiment of the application, the configuration information may further include an index of each virtual carrier in the N downlink virtual carriers, or include an index of each downlink virtual carrier in the N downlink virtual carriers and an index of each uplink virtual carrier in the M uplink virtual carriers.

In an embodiment of the application, the terminal may independently determine a resource grid and an OFDM baseband signal on each virtual carrier (including a downlink virtual carrier and an uplink virtual carrier).

It should be understood that, for the resource grid and the OFDM baseband signal herein, refer to the prior art, and details are not described herein again.

In another embodiment of the application, the method may include the following operations.

S240: The network device determines a first downlink virtual carrier in the N downlink virtual carriers, where the first downlink virtual carrier is used to determine a BWP (denoted as a first BWP).

S250: The network device sends indication information (denoted as first indication information) to the terminal, where the first indication information is used to indicate the first downlink virtual carrier.

S260: The terminal determines the first downlink virtual carrier based on the first indication information.

S270: The terminal determines the first BWP based on the first downlink virtual carrier.

For this embodiment, refer to the foregoing embodiments (for example, S210 to S230). For example, the operations in this embodiment may be performed after one or more operations in S210 to S230 in the foregoing embodiments, and vice versa. For another example, terms and descriptions in this embodiment are also applicable to the foregoing embodiments.

It may be understood that any operation in S240 to S270 may be separately split and used as different embodiments. For example, for the network device, the network device may determine a relationship between a downlink virtual carrier and a BWP by using S240 and/or S250. For the terminal, the foregoing association relationship may also be obtained by using S260 and/or S270.

Specifically, the network device may configure the first BWP on the downlink virtual carrier, and may indicate, to the terminal by using the first indication information, that the first BWP is configured based on the first downlink virtual carrier.

In an embodiment, the network device may configure the first BWP in a downlink virtual carrier (for example, the first downlink virtual carrier). For example, referring to FIG. 9, a carrier #A includes a virtual carrier #1 and a virtual carrier #2, and the first BWP is configured in the virtual carrier #1. The virtual carrier #1 herein is the first downlink virtual carrier. In this case, the network device may include an index of the first downlink virtual carrier in the first indication information, to indicate that the first BWP is configured in the first downlink virtual carrier. In another embodiment, the network device may configure the first BWP across virtual carriers. In other words, the first BWP may occupy resources of a plurality of virtual carriers. For example, referring to FIG. 10, a carrier #A includes a virtual carrier #1 and a virtual carrier #2, and the first BWP crosses the virtual carrier #1 and the virtual carrier #2. The virtual carrier #1 herein is the first downlink virtual carrier. In this case, the network device may include, in the first indication information, an index of a virtual carrier (for example, the first downlink virtual carrier) at a start position (or an end position or any other position) of the first BWP, to indicate that the start position of the first BWP is relative to the first downlink virtual carrier.

In addition, the network device may further indicate a position (all positions in the application are positions in frequency domain) of the first BWP and/or a bandwidth value of the first BWP through the first indication information. For example, the first indication information may be used to indicate the start position and the end position of the first BWP, or the first indication information may be used to indicate the start position of the first BWP and the bandwidth value of the first BWP. For example, the first indication information may carry an offset (for example, denoted as a fourth offset) or an index (for example, denoted as a fourth index) to indicate the start position (or the end position or any other position) of the first BWP. An example in which the first indication information indicates the start position of the first BWP is used. The fourth offset may be an offset of a frequency domain resource at the start position of the first BWP relative to a start position or an end position of the first downlink virtual carrier. In addition, resource blocks on the first downlink virtual carrier may be numbered from an index 0 in a frequency increasing direction. In this case, the fourth index may correspond to a number of a resource block corresponding to the start position of the first BWP in the first downlink virtual carrier. It should be understood that, the resource blocks in the first downlink virtual carrier may alternatively be numbered from an index 1. This is not limited in this embodiment of the application. It should be understood that bandwidth of the first BWP may include X1 subcarriers. For example, the bandwidth of the first BWP may be Y1 resource blocks and X1 subcarriers.

In an embodiment, the first downlink virtual carrier includes a part or all of the first BWP. Alternatively, the first downlink virtual carrier partially or completely overlaps the first BWP in frequency domain.

It should be understood that the first configuration information may include the first indication information, or may be another piece of signaling different from the first indication information. This is not limited in the application. In other words, the network device may indicate the first downlink virtual carrier by using the first configuration information.

It should be further understood that a sequence of S210 and S240 is not limited in the application. S210 and S240 may be performed at the same time, or S210 may be performed before S240, or S210 may be performed after S240.

In addition, in the application, S210 or S210 to S230 may not be performed, but S240 to S270 are performed. In this case, the configuration information of the N downlink virtual carriers may be specified by a protocol. However, this is not limited in this embodiment of the application.

In an embodiment of the application, the method may further include the following operations.

The network device determines a first uplink virtual carrier in the M uplink link virtual carriers, where the first uplink virtual carrier is used to determine a BWP (denoted as a second BWP). The network device sends indication information (denoted as second indication information) to the terminal, where the second indication information is used to indicate the first uplink virtual carrier. S260: The terminal determines the first uplink virtual carrier based on the second indication information, and the terminal determines the second BWP based on the first uplink virtual carrier.

Specifically, the network device may configure the second BWP on the uplink virtual carrier, and may indicate, to the terminal by using the second indication information, that the second BWP is configured based on the first uplink virtual carrier.

In an embodiment, the network device may configure the second BWP in an uplink virtual carrier (for example, the first uplink virtual carrier). In this case, the network device may include an index of the first uplink virtual carrier in the second indication information, to indicate that the second BWP is configured in the first uplink virtual carrier. In another embodiment, the network device may configure the second BWP across virtual carriers. In other words, the second BWP may occupy resources of a plurality of virtual carriers. In this case, the network device may include, in the second indication information, an index of a virtual carrier (for example, the first uplink virtual carrier) at a start position (or an end position or any other position) of the second BWP, to indicate that the start position of the second BWP is relative to the first uplink virtual carrier.

In addition, the network device may further indicate a position of the second BWP and/or a bandwidth value of the second BWP through the second indication information. For example, the second indication information may be used to indicate the start position and the end position of the second BWP, or the second indication information may be used to indicate the start position of the second BWP and the bandwidth value of the second BWP. For example, the second indication information may carry an offset (for example, denoted as a fifth offset) or an index (for example, denoted as a fifth index) to indicate the start position (or the end position or any other position) of the second BWP. An example in which the second indication information indicates the start position of the second BWP is used. The fifth offset may be an offset of a frequency domain resource at the start position of the second BWP relative to the start position or the end position of the first uplink virtual carrier. In addition, resource blocks on the first uplink virtual carrier may be numbered from an index 0 in a frequency increasing direction. In this case, the fifth index may correspond to a number of a resource block corresponding to the start position of the second BWP in the first uplink virtual carrier. It should be understood that, the resource blocks in the first uplink virtual carrier may alternatively be numbered from an index 1. This is not limited in this embodiment of the application. It should be understood that bandwidth of the second BWP may include X2 subcarriers. For example, the bandwidth of the second BWP may be Y2 resource blocks and X2 subcarriers.

In an embodiment, the first uplink virtual carrier includes a part or all of the second BWP. Alternatively, the first uplink virtual carrier partially or completely overlaps the second BWP in frequency domain.

It should be understood that the second indication information and the second indication information may be carried by one piece of signaling, or may each be carried by one piece of signaling. This is not limited in this embodiment of the application.

It should be further understood that the first indication information and/or the second indication information and the configuration information may be carried by one piece of signaling, or may each be carried by one piece of signaling. This is not limited in this embodiment of the application. Alternatively, the configuration information may include the first indication information and/or the second indication information.

It should be understood that the first BWP is a BWP used for downlink transmission, and the second BWP is a BWP used for uplink transmission. The first downlink virtual carrier may be any virtual carrier in the N downlink virtual carriers, and the first uplink virtual carrier may be any virtual carrier in the M uplink virtual carriers.

In an embodiment of the application, the method may further include the following operations.

S280: The network device maps a to-be-transmitted signal to a resource grid to obtain an OFDM baseband signal, where the resource grid is determined based on the N downlink virtual carriers.

In an embodiment, subcarriers whose quantity is $N_{grid}^{size}$ and that are included in the N downlink virtual carriers form the resource grid. $N_{grid}^{size}>1$, and $N_{grid}^{size}$ is an integer. During signal transmission, the network device may map the to-be-transmitted signal to the $N_{grid}^{size}$ subcarriers, to obtain the OFDM baseband signal.

It should be understood that the $N_{grid}^{size}$ subcarriers are subcarriers that can be used for signal transmission and that are in the N downlink virtual carriers, and the to-be-transmitted signal may also be referred to as a complex value (complex value).

S290: The network device sends the OFDM baseband signal. Correspondingly, the terminal determines the resource grid, and receives the OFDM baseband signal based on the resource grid.

Specifically, the network device maps the to-be-transmitted signal to the resource grid, to obtain the OFDM baseband signal, and sends the OFDM baseband signal. Correspondingly, the terminal receives the OFDM baseband signal on the resource grid.

It should be understood that, in an embodiment of the application, the terminal and the network device may learn of, through protocol specification or predefinition, the resource grid defined on the N downlink virtual carriers.

According to the resource configuration method in an embodiment of the application, because there is only one resource grid on the N downlink virtual carriers, for one to-be-transmitted signal, the network device sends a relatively long OFDM baseband signal. This helps reduce a peak to average power ratio (peak to average power ratio, PAPR), and reduce spectrum spreading interference and in-band signal distortion, and this also helps uniformly suppress noise interference, thereby obtaining better transmission quality.

The following describes the OFDM baseband signal in detail by using an example in which the N downlink virtual carriers include a virtual carrier #1 and a virtual carrier #2.

In an embodiment, the virtual carrier #1 includes $N_{grid,1}^{size}$ subcarriers, the virtual carrier #2 includes $N_{grid,2}^{size}$ subcarriers, and both $N_{grid,1}^{size}$ and $N_{grid,2}^{size}$ are integers greater than 0. In addition, the OFDM baseband signal includes a first summation item and a second summation item. The first summation item is a sum of to-be-transmitted signals on the $N_{grid,1}^{size}$ subcarriers, and the second summation item is a sum of to-be-transmitted signals on the $N_{grid,2}^{size}$ subcarriers.

In an embodiment, a summation upper bound of the first summation item and a summation lower bound of the second summation item are determined based on total bandwidth of the virtual carrier #1 and the virtual carrier #2, and positions and bandwidth values of the virtual carrier #1 and the virtual carrier #2 in frequency domain.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and
the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}+M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of the virtual carrier #1. An absolute value of $M_2$ is a quantity of subcarriers included in a frequency domain resource between the configured frequency position and a start position of the virtual carrier #2. It should be understood that, in the application, any two subcarriers whose index difference is 1 are adjacent in frequency domain, and a larger index indicates a higher frequency of a corresponding subcarrier.

In an embodiment, the configured frequency position may be predefined or configured by the network device in real time.

In an embodiment, the configured frequency position is a center frequency position between a start position of the virtual carrier #1 and an end position of the virtual carrier #2.

In another embodiment, the virtual carrier #1 corresponds to a first phase offset, and the virtual carrier #2 corresponds to a second phase offset. The first phase offset and the second phase offset are determined based on a position of the virtual carrier #1 in frequency domain, a bandwidth value of the virtual carrier #1, a position of the virtual carrier #2 in frequency domain, and a bandwidth value of the virtual carrier #2.

Further, when a frequency corresponding to the end position of the virtual carrier #1 is lower than a frequency corresponding to the start position of the virtual carrier #2, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

In the foregoing parameters, $-M_1+x$ is the first phase offset, $M_2+x$ is the second phase offset, k is an index of a subcarrier in the resource grid, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, and $a_{k,l}$ represents the to-be-transmitted signal that is mapped to a symbol whose index is l and to a subcarrier whose index is k in the resource grid. t represents any time in a time unit, and the time unit may be anyone of a system frame, a subframe, a slot, or a mini-slot. $k_0$ represents a subcarrier-level offset, $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of the virtual carrier #1. An absolute value of $M_2$ is a quantity of subcarriers included in a frequency domain resource between the configured frequency position and a start position of the virtual carrier #2.

In an embodiment, the configured frequency position may be predefined or configured by the network device in real time.

In an embodiment, the configured frequency position is a center frequency position between a start position of the virtual carrier #1 and an end position of the virtual carrier #2.

Figure 11:
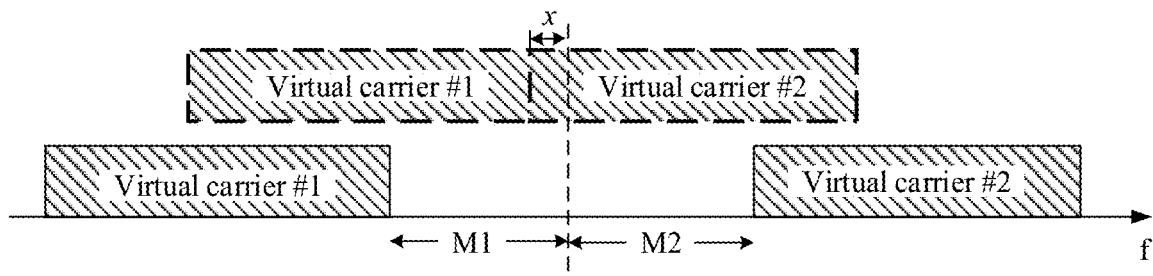
FIG. 11 is a schematic diagram of a virtual carrier according to an embodiment of the application.

For example, referring to FIG. 11, the virtual carrier #1 includes the $N_{grid,1}^{size}$ subcarriers, the virtual carrier #2 includes the $N_{grid,1}^{size}$ subcarriers, and a central position of the virtual carrier #1 and the virtual carrier #2 is shown by a dashed line in FIG. 11. A quantity of subcarriers included in a frequency domain resource between the central position and an end position of the virtual carrier #1 is $M_1$. A quantity of subcarriers included in a frequency domain resource between the central position and a start position of the virtual carrier #2 is $M_2$. The virtual carrier #1 and the virtual carrier #2 indicated by dashed lines are positions of the virtual carrier #1 and the virtual carrier #2 in the resource grid. A quantity of subcarriers included in a frequency domain resource between the central position and the end position of the virtual carrier #1 in the resource grid is |x|.

The foregoing mainly describes a resource grid and an OFDM baseband signal during downlink transmission. A resource grid defined on the M uplink virtual carriers during uplink transmission is similar to that in a method for defining a downlink virtual carrier. Specifically, when M>1, subcarriers whose quantity is Q and that are included in the M uplink virtual carriers form the resource grid. Q>1, and Q is an integer. During signal transmission, the terminal may map the to-be-transmitted signal to the Q subcarriers, to obtain the OFDM baseband signal. For a form of the OFDM baseband signal during uplink transmission, refer to the downlink OFDM baseband signal described above. Details are not described herein again.

In the prior art, when a signal is transmitted by using a virtual carrier, a to-be-transmitted signal is usually mapped to a resource grid for transmission. The resource grid on the virtual carrier includes all subcarriers of the virtual carrier. However, if there is an unavailable subcarrier in the virtual carrier, that is, there is a subcarrier that cannot be used to transmit a signal in the virtual carrier, it is definitely unreasonable to map the to-be-transmitted signal to the unavailable subcarrier. Therefore, for a scenario in which there is an unavailable subcarrier in the virtual carrier, the resource grid needs to be redefined for efficient and proper transmission.

In view of this, the application provides a communication method. A resource grid is redefined, so that it is more proper to map a to-be-transmitted signal to the resource grid, thereby improving transmission efficiency.

Figure 12:
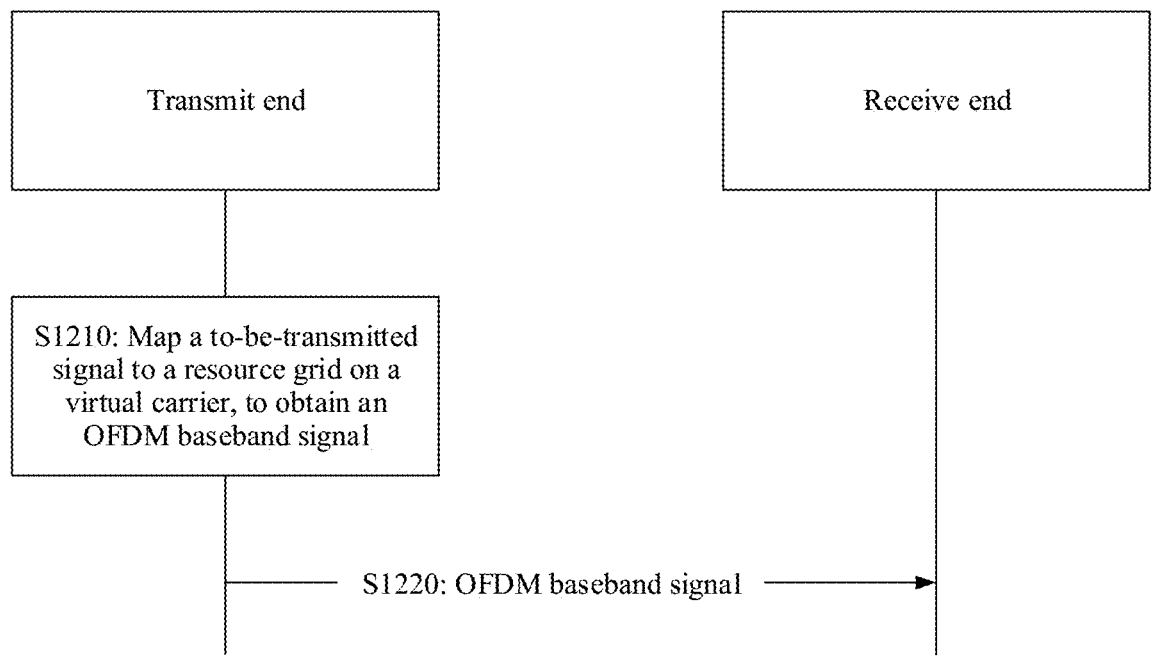
FIG. 12 is a schematic flowchart of a communication method according to an embodiment of the application.

FIG. 12 shows a communication method according to an embodiment of the application. The method shown in FIG. 12 mainly includes operation S1210 and operation S1220. The following describes in detail the communication method shown in FIG. 12. It should be understood that, in the method shown in FIG. 12, a transmit end may be a network device, and a receive end may be a terminal. Alternatively, a transmit end may be a terminal, and a receive end may be a network device.

S1210: The transmit end maps a to-be-transmitted signal to a resource grid on a virtual carrier, to obtain an OFDM baseband signal.

In an embodiment, the virtual carrier includes P subcarriers, and an unavailable resource in the virtual carrier includes M subcarriers in the P subcarriers. The resource grid includes P−M subcarriers other than the M subcarriers in the P subcarriers. P>M≥1, and both P and M are integers. Herein, $P-M=N_{grid}^{size}$. In other words, the virtual carrier includes $N_{grid}^{size}$ subcarriers (the $N_{grid}^{size}$ subcarriers are available subcarriers) and M unavailable subcarriers, and the resource grid includes the $N_{grid}^{size}$ subcarriers. During signal transmission, the transmit end may map the to-be-transmitted signal to the $N_{grid}^{size}$ subcarriers, to obtain the OFDM baseband signal.

It should be understood that the available subcarrier is a subcarrier that can be used for signal transmission, and the unavailable subcarrier is a subcarrier that cannot be used for signal transmission. The to-be-transmitted signal may also be referred to as a complex value.

Figure 13:
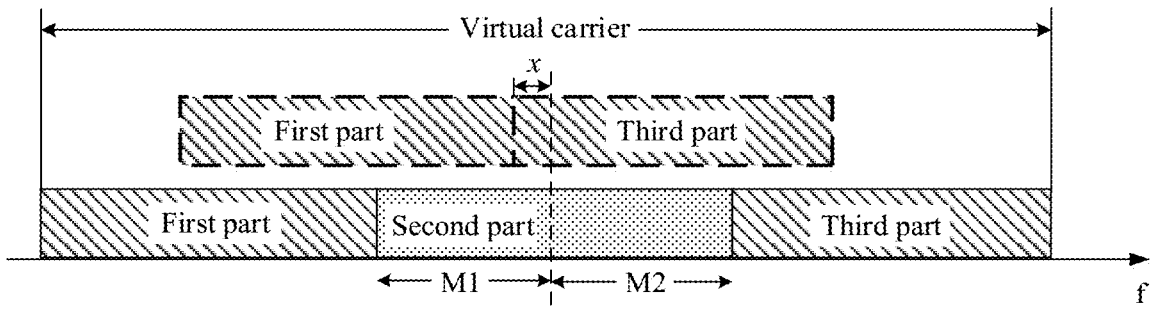
FIG. 13 is a schematic diagram of a virtual carrier according to an embodiment of the application.

For example, FIG. 13 is a schematic diagram of a virtual carrier. As shown in FIG. 13, the virtual carrier includes three parts in total: a first part, a second part, and a third part. The first part and the third part are available resources, and the second part is an unavailable resource. The first part and the third part include $N_{grid}^{size}$ subcarriers in total, and the second part includes M subcarriers in total.

In an embodiment, the M subcarriers (that is, the M unavailable subcarriers) are first-type subcarriers, or the M subcarriers include the first-type subcarriers and second-type subcarriers.

For example, the first-type subcarrier is a subcarrier with a high interference level, and the receive end needs to perform interference isolation through radio frequency filtering. The second-type subcarrier is a subcarrier with a low interference level, and the receive end may perform interference isolation through baseband filtering.

S1220: The transmit end sends the OFDM baseband signal. Correspondingly, the receive end determines the resource grid, and receives the OFDM baseband signal based on the resource grid.

Specifically, the transmit end maps the to-be-transmitted signal to the resource grid, to obtain the OFDM baseband signal, and sends the OFDM baseband signal. Correspondingly, the receive end receives the OFDM baseband signal on the resource grid.

It should be understood that, in an embodiment of the application, the terminal and the network device may learn of, through protocol specification or predefinition, the resource grid on the virtual carrier. For example, it may be specified in a protocol that the resource grid includes only the available subcarriers on the virtual carrier. After the terminal learns of a configuration of the virtual carrier, for example, after the terminal learns of, through resource configuration information sent by the network device, information about a bandwidth value of the virtual carrier, information about a start position or an end position of the virtual carrier, information about a start position, a central position, or an end position of the unavailable resource in frequency domain, and information about a size of a frequency domain resource occupied by the unavailable resource, the resource grid or a form of the resource grid can be determined.

According to the communication method in an embodiment of the application, the resource grid is defined on an available resource of the virtual carrier, so that the to-be-transmitted signal is more properly mapped to the resource grid, thereby improving transmission efficiency. In addition, because there is only one resource grid on the virtual carrier, for one to-be-transmitted signal, the transmit end sends a relatively long OFDM baseband signal. This helps reduce a peak to average power ratio (peak to average power ratio, PAPR), and reduce spectrum spreading interference and in-band signal distortion, and this also helps uniformly suppress noise interference, thereby obtaining better transmission quality.

In an embodiment, the $N_{grid}^{size}=P-M$ subcarriers include contiguous $N_{grid,1}^{size}$ subcarriers in frequency domain and contiguous $N_{grid,2}^{size}$ subcarriers in frequency domain, and both $N_{grid,1}^{size}$ and $N_{grid,2}^{size}$ are integers greater than 0. In addition, the OFDM baseband signal includes a first summation item and a second summation item. The first summation item is a sum of to-be-transmitted signals on the $N_{grid,1}^{size}$ subcarriers, and the second summation item is a sum of to-be-transmitted signals on the $N_{grid,2}^{size}$ subcarriers.

In an embodiment, a summation upper bound of the first summation item and a summation lower bound of the second summation item are determined based on bandwidth of the virtual carrier, a position of the unavailable resource (that is, the M subcarriers) in frequency domain, and bandwidth of the unavailable resource.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and
the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters,
in the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}+M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment. The first segment corresponds to positions of the $N_{grid,1}^{size}$ subcarriers in frequency domain, and the second segment corresponds to positions of the $N_{grid,2}^{size}$ subcarriers in frequency domain.

In an embodiment, the configured frequency position may be predefined or configured by the network device in real time.

In an embodiment, the configured frequency position is a center frequency position between a start position of the first downlink virtual carrier and an end position of the second downlink virtual carrier.

It should be understood that, in the application, any two subcarriers whose index difference is 1 are adjacent in frequency domain, and a larger index indicates a higher frequency of a corresponding subcarrier.

It should be understood that the $N_{grid,1}^{size}$ subcarriers may correspond to the first part of the virtual carrier shown in FIG. 13, the $N_{grid,2}^{size}$ subcarriers correspond to the third part of the virtual carrier shown in FIG. 13, and a central position of the virtual carrier is shown by a dashed line in FIG. 13. A quantity of subcarriers included in a frequency domain resource between the central position of the virtual carrier and an end position of the first part is $M_1$, and a quantity of subcarriers included in a frequency domain resource between the central position of the virtual carrier and a start position of the third part is $M_2$. The first summation item is used to perform summation on a to-be-transmitted signal mapped to the first part, and the second summation item is used to perform summation on a to-be-transmitted signal mapped to the third part.

In another embodiment, the first summation item corresponds to a first phase offset, and the second summation item corresponds to a second phase offset. The first phase offset and the second phase offset are determined based on a frequency domain position of the first segment, a bandwidth value of the first segment, a frequency domain position of the second segment, and a bandwidth value of the second segment. The first segment corresponds to the $N_{grid,1}^{size}$ subcarriers, and the second segment corresponds to the $N_{grid,2}^{size}$ subcarriers.

Further, when a frequency corresponding to the end position of the first segment is lower than a frequency corresponding to the start position of the second segment, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

In the foregoing parameters, $-M_1+x$ is the first phase offset, $M_2+x$ is the second phase offset, k is an index of a subcarrier in the resource grid, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, and $a_{k,l}$ represents the to-be-transmitted signal that is mapped to a symbol whose index is l and to a subcarrier whose index is k in the resource grid. t represents any time in a time unit, and the time unit may be anyone of a system frame, a subframe, a slot, or a mini-slot. $k_0$ represents a subcarrier-level offset, $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is a real number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment.

In an embodiment, the configured frequency position may be predefined or configured by the network device in real time.

In an embodiment, the configured frequency position is a center frequency position between a start position of the first segment and an end position of the second segment.

It should be understood that the $N_{grid,1}^{size}$ subcarriers may correspond to the first part of the virtual carrier shown in FIG. 13, the $N_{grid,2}^{size}$ subcarriers correspond to the third part of the virtual carrier shown in FIG. 13, and a central position of the virtual carrier is shown by a dashed line in FIG. 13. A quantity of subcarriers included in a frequency domain resource between the central position of the virtual carrier and an end position of the first part is $M_1$, and a quantity of subcarriers included in a frequency domain resource between the central position of the virtual carrier and a start position of the third part is $M_2$. The first part and the third part indicated by dashed lines are positions of the first part and the third part in the resource grid. A quantity of subcarriers included in a frequency domain resource between the central position of the virtual carrier and the first part in the resource grid is |x|.

Figure 14:
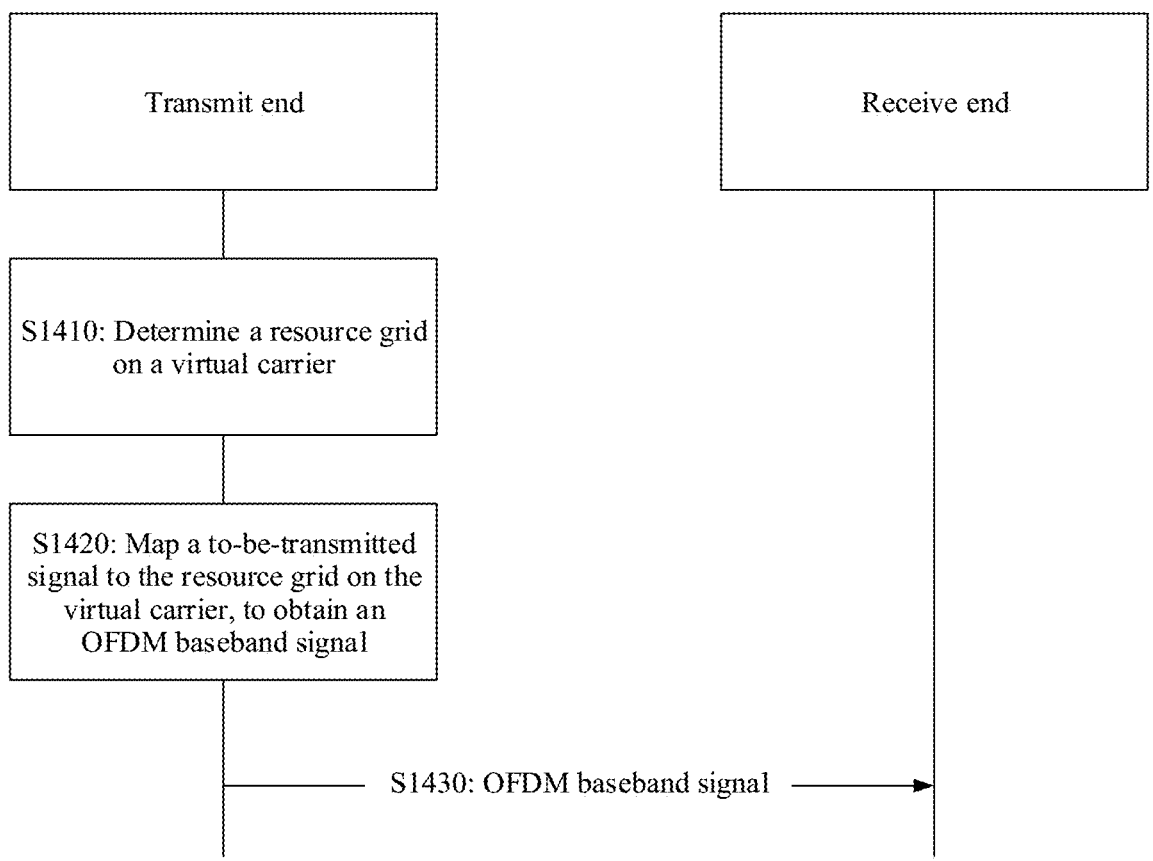
FIG. 14 is a schematic flowchart of a communication method according to an embodiment of the application.

FIG. 14 shows a communication method according to another embodiment of the application. The method may be applied to a scenario in which the virtual carrier includes at least two resource sets. The following describes in detail the method shown in FIG. 14. It should be understood that, in the method shown in FIG. 14, a transmit end may be a network device, and a receive end may be a terminal. Alternatively, a transmit end may be a terminal, and a receive end may be a network device.

S1410: The transmit end determines a resource grid on a virtual carrier based on at least two resource sets that form the virtual carrier.

A quantity of subcarriers included in the at least two resource sets is equal to a quantity of subcarriers included in the resource grid. In other words, a quantity of subcarriers included in the resource grid is equal to a quantity of subcarriers included in the virtual carrier, or the resource grid and the virtual carrier occupy a same frequency domain resource. Each resource set includes at least one subcarrier, and when the at least one subcarrier is a plurality of subcarriers, the at least one subcarrier is contiguous in frequency domain. In other words, the plurality of subcarriers in the resource set are contiguous in frequency domain.

It should be understood that resource sets may be contiguous in frequency domain, or may overlap with each other, for example, may completely overlap or partially overlap.

Figure 15:
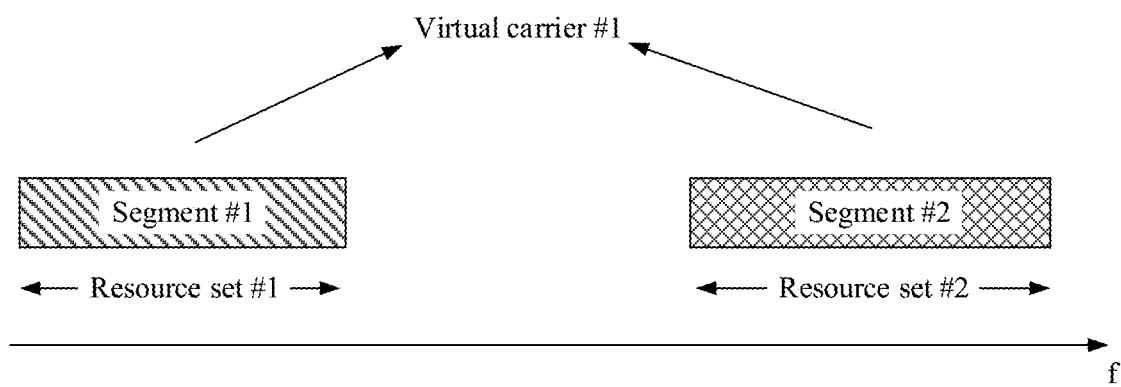
FIG. 15 is a schematic diagram of a virtual carrier according to an embodiment of the application.

For example, FIG. 15 is a schematic diagram of a virtual carrier. Referring to FIG. 15, a virtual carrier #1 includes two segments: a segment #1 and a segment #2. The segment #1 is a frequency domain resource corresponding to a resource set #1, and the segment #2 is a frequency domain resource corresponding to a resource set #2. The segment #1 and the segment #2 are inconsecutive in frequency domain, but the segment #1 and the segment #2 each are a segment of consecutive frequency domain resources.

S1420: The transmit end maps a to-be-transmitted signal to the resource grid, to obtain an OFDM baseband signal.

S1430: The transmit end sends the OFDM baseband signal. Correspondingly, the receive end determines the resource grid, and receives the OFDM baseband signal based on the resource grid.

Therefore, according to the communication method in an embodiment of the application, a plurality of discrete spectrum resources may be aggregated by using one virtual carrier, to enable efficient communication on a discrete spectrum. In addition, a relatively long OFDM baseband signal is generated on the virtual carrier. This helps reduce a peak to average power ratio (peak to average power ratio, PAPR), and reduce spectrum spreading interference and in-band signal distortion, and this also helps suppress noise interference, thereby obtaining better transmission quality.

In an embodiment of the application, the network device may further configure, for the terminal, categories or interference levels of subcarriers between two inconsecutive resource sets in frequency domain. For example, the network device may configure that subcarriers between the resource set #1 and the resource set #2 shown in FIG. 15 include a first-type subcarrier and a second-type subcarrier. The first-type subcarrier is a subcarrier with a high interference level, and the terminal needs to perform interference isolation through radio frequency filtering. The second-type subcarrier is a subcarrier with a low interference level, and the terminal may perform interference isolation through baseband filtering.

In an embodiment, each resource set corresponds to one phase offset, and each phase offset is determined based on a frequency domain position and bandwidth of at least one subcarrier included in the resource set corresponding to the phase offset.

For example, the resource set #1 and the resource set #2 in FIG. 15 each correspond to one phase offset. A phase offset corresponding to the resource set #1 is determined based on a position (that is, a frequency-domain position), in frequency domain, and bandwidth of at least one subcarrier included in the resource set #1. A phase shift corresponding to the resource set #2 is determined based on a position, in frequency domain, of at least one subcarrier included in the resource set #2. In other words, the phase offset corresponding to the resource set #1 is determined based on the position and the bandwidth of the frequency domain resource (that is, the segment #1) corresponding to the resource set #1, and the phase offset corresponding to the resource set #2 is determined based on the position and the bandwidth of the frequency domain resource (that is, the segment #2) corresponding to the resource set #2.

Further, the at least two resource sets include a first resource set and a second resource set. The first resource set includes $N_{grid,1}^{size}$ subcarriers, the second resource set includes $N_{grid,2}^{size}$ subcarriers, the $N_{grid,1}^{size}$ subcarriers correspond to a first segment in the virtual carrier, the $N_{grid,2}^{size}$ subcarriers correspond to a second segment in the virtual carrier, and both $N_{grid,1}^{size}$ and $N_{grid,2}^{size}$ are integers greater than 0. In this case, the OFDM baseband signal includes a first summation item and a second summation item. The first summation item is a sum of to-be-transmitted signals on the $N_{grid,1}^{size}$ subcarriers, and the second summation item is a sum of to-be-transmitted signals on the $N_{grid,2}^{size}$ subcarriers. The first summation item corresponds to a first phase offset, and the second summation item corresponds to a second phase offset.

It should be understood that the first resource set may correspond to the resource set #1 in FIG. 15, and the second resource set may correspond to the resource set #2 in FIG. 15. The first segment may correspond to the segment #1 in FIG. 15, and the second segment may correspond to the segment #2 in FIG. 15.

Further, when a frequency corresponding to the end position of the first segment is lower than a frequency corresponding to the start position of the second segment, the first summation item is:

$$\sum_{k=0}^{N_{grid,1}^{size}-1} a_{k,l} \cdot e^{j2\pi(k+k_0-N_{grid}^{size}/2-M_1+x)\Delta f(t-T_l)},$$

and
the second summation item is:

$$\sum_{k=N_{grid,1}^{size}}^{(N_{grid,1}^{size}+N_{grid,2}^{size})-1} a_{k,l} \cdot e^{j2\pi(k+k_0-N_{grid}^{size}/2+M_2+x)\Delta f(t-T_l)}.$$

$-M_1+x$ is the first phase offset, $M_2+x$ is the second phase offset, $k$ is an index of a subcarrier in the resource grid, $N_{grid}^{size}$ is a quantity of subcarriers included in the at least two resource sets, an absolute value of X is a quantity of subcarriers included in a frequency domain resource between a subcarrier whose index is $(N_{grid,1}^{size}+N_{grid,2}^{size})/2-1$ and a subcarrier whose index is $N_{grid,1}^{size}-1$ in the resource grid, $a_{k,l}$ represents the to-be-transmitted signal that is mapped to a symbol whose index is l and to a subcarrier whose index is k in the resource grid, $k_0$ represents a subcarrier-level offset, t represents anytime in a time unit, $\Delta f$ represents a subcarrier spacing, $T_l$ is determined based on a time domain position of the symbol l, l is an integer greater than or equal to 0, both $\Delta f$ and $T_l$ are greater than 0, $k_0$ is areal number, an absolute value of $M_1$ is a quantity of subcarriers included in a frequency domain resource between a configured frequency position and the end position of the first segment, and an absolute value of $M_2$ is a quantity of subcarriers included in a frequency domain resource between the configured frequency position and the start position of the second segment.

In an embodiment, the configured frequency position may be predefined or configured by the network device in real time.

In an embodiment, the configured frequency position is a center frequency position between a start position of the first segment and an end position of the second segment.

Figure 16:
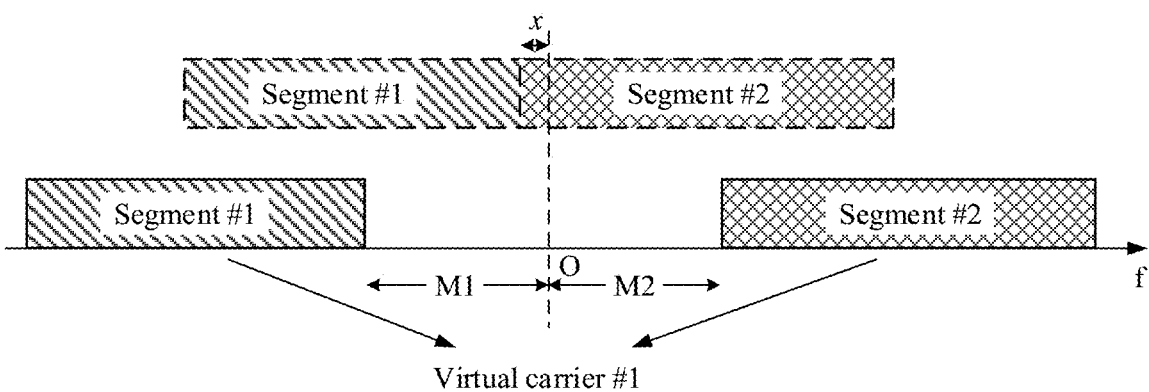
FIG. 16 is a schematic diagram of a virtual carrier according to an embodiment of the application.

Referring to FIG. 16, a first segment and a second segment shown by solid lines are the first segment and the second segment in the virtual carrier, and dashed lines indicate positions of the first segment and the second segment in the resource grid. A central position of the first segment and the second segment is a position of a point O. A quantity of subcarriers included in a frequency domain resource between an end position of the first segment in the virtual carrier and the point O is $M_1$. A quantity of subcarriers included in a frequency domain resource between a start position of the second segment in the virtual carrier and the point O is $M_2$. A quantity of subcarriers included in a frequency domain resource between the point O and the end position of the first segment in the resource grid is $|x|$.

In an embodiment, the at least two resource sets include a first resource set and a second resource set. The first resource set includes $N_{grid,1}^{size}$ subcarriers, the second resource set includes $N_{grid,2}^{size}$ subcarriers, the $N_{grid,1}^{size}$ subcarriers correspond to a first segment in the virtual carrier, the $N_{grid,2}^{size}$ subcarriers correspond to a second segment in the virtual carrier, and both $N_{grid,1}^{size}$ and $N_{grid,2}^{size}$ are integers greater than 0. In this case, the OFDM baseband signal includes a first summation item and a second summation item. The first summation item is a sum of to-be-transmitted signals on the $N_{grid,1}^{size}$ subcarriers, and the second summation item is a sum of to-be-transmitted signals on the $N_{grid,2}^{size}$ subcarriers. A summation upper bound of the first summation item and a summation lower bound of the second summation item are determined based on bandwidth of the virtual carrier and positions of the first segment and the second segment in frequency domain.

Further, the first summation item is:

$$\sum_{k=-N_{grid,1}^{size}-M_1}^{-M_1-1} a_{k+N_{grid,1}^{size}+M_1,l} \cdot e^{j2\pi(k+k_0)\Delta f(t-T_l)},$$

and the second summation item is:

$$\sum_{k=M_2}^{N_{grid,2}^{size}+M_2-1} a_{k+N_{grid,2}^{size}-M_2,l} \cdot e^{j2\pi(k+k_0)\Delta f(t-T_l)}.$$

In the foregoing parameters, when $k=-N_{grid,1}^{size}-M_1$, $-N_{grid,1}^{size}-M_1+1, \ldots, -M_1-1$, $a_{k+N_{grid,1}^{size}+M_1,l}$ represents the to-be-transmitted signal that is mapped to a symbol whose index is l and to a subcarrier whose index is $k+N_{grid,1}^{size}+M_1$ in the resource grid. When $k=M_2, M_2+1, \ldots, N_{grid,2}^{size}+M_2-1$, $a_{k+N_{grid,2}^{size}+M_2,l}$ represents the to-be-transmitted signal that is mapped to the symbol whose index is l and to a subcarrier whose index is $k+N_{grid,2}^{size}-M_2$ in the resource grid. t represents any time in a time unit, and the time unit may be any one of a system frame, a subframe, a slot, or a mini-slot. $k_0$ represents a subcarrier-level offset, $\Delta f$ represents a subcarrier spacing, and $T_l$ is determined based on a time-domain position of the symbol l. l is an integer greater than or equal to 0, both $\Delta f$ and $T_l$ are greater than 0, and $k_0$ is areal number. In an embodiment, $k_0$ may be an integer. An absolute value of $M_1$ is a quantity of subcarriers included in a frequency domain resource between a configured frequency position and an end position of a first segment. An absolute value of $M_2$ is a quantity of subcarriers included in a frequency domain resource between the configured frequency position and a start position of a second segment.

In an embodiment, the configured frequency position may be predefined or configured by the network device in real time.

In an embodiment, the configured frequency position is a center frequency position between a start position of the first downlink virtual carrier and an end position of the second downlink virtual carrier.

In an embodiment, in an embodiment of the application, before S1410, the method may further include the following operation.

The network device sends resource configuration information to the terminal, where the resource configuration information is used to indicate the virtual carrier. Correspondingly, the terminal receives the resource configuration information sent by the network device, and determines the virtual carrier based on the resource configuration information.

Specifically, the resource configuration information includes configuration information of the virtual carrier, for example, a frequency domain position and bandwidth value information corresponding to each resource set included in the virtual carrier.

That the virtual carrier includes the first resource set and the second resource set is used as an example. The resource configuration information may be used to indicate a start position of the first segment and a start position of the second segment. In other words, the resource configuration information includes start position information of the first segment and start position information of the second segment. The terminal may determine the start position of the first segment and the start position of the second segment based on the resource configuration information. It should be understood that the resource configuration information may further include a bandwidth value corresponding to the first segment and a bandwidth value corresponding to the second segment.

In an embodiment, the start position of the first segment and the start position of the second segment may be indicated by carrying a first offset and a second offset in the resource configuration information. The first offset is an offset of a frequency domain resource at a start position of the first segment relative to a reference point, and the second offset is an offset of a frequency domain resource at a start position of the second segment relative to the reference point or an offset of a frequency domain resource at a start position of the second segment relative to an end position of the first segment.

For example, referring to FIG. 5 described above, the first segment and the second segment in an embodiment may respectively correspond to the first downlink virtual carrier and the second downlink virtual carrier shown in FIG. 5. The first offset may be the first offset Ost 1 shown in FIG. 5, and the second offset may be the second offset Ost 2 shown in FIG. 5.

Further, if the at least two resource sets further include a third resource set in addition to the first resource set and the second resource set, and the third resource set corresponds to a third segment in the virtual carrier, the resource configuration information further includes a third offset. The third offset is an offset of a frequency domain resource at a start position of the third segment relative to the reference point, or an offset of a frequency domain resource at a start position of the third segment relative to an end position of the first segment, or an offset of a frequency domain resource at a start position of the third segment relative to the end position of the second segment.

In another embodiment, the start position of the first segment and the start position of the second segment may be indicated by carrying a first index and a second index in the resource configuration information. The first index is an index of a common resource block corresponding to a start position of the first segment, and the second index is an index of a common resource block corresponding to a start position of the second segment.

For example, if the first index is 6 and the second index is 12, the start position of the first segment is a common resource block whose index is 6, and the start position of the second segment is a common resource block whose index is 12.

In still another embodiment, the start position of the first segment and the start position of the second segment may be indicated by carrying a first carrier index, a second carrier index, and a third offset in the resource configuration information. Herein, the first carrier index is an index of a common resource block corresponding to the start position of the first segment, and the second carrier index and the third offset are used to determine the start position of the second segment.

For example, if the first carrier index is 6, the second carrier index is 12, and the third offset is six subcarriers, the start position of the first segment is a common resource block whose index is 6, and the start position of the second segment is the seventh subcarrier in a common resource block whose index is 12.

It should be understood that one resource set in the communication method shown in FIG. 14 may correspond to one virtual carrier (for example, a downlink virtual carrier or an uplink virtual carrier) in the resource configuration method described above. Therefore, for a method for configuring a position, in frequency domain, of each resource set or each segment corresponding to each resource set in the communication method shown in FIG. 13, refer to the method for configuring a position, in frequency domain, of a downlink virtual carrier or an uplink virtual carrier described above. To avoid repetition, details are not described herein again.

The foregoing describes in detail examples of the resource configuration method and the communication method provided in the application. It may be understood that to implement the foregoing functions, the terminal and the network device include corresponding hardware structures and/or software modules for performing the functions. A person skilled in the art should be easily aware that, units and algorithm operations in the examples described with reference to the embodiments disclosed in this specification may be implemented in a form of hardware or in a form of a combination of hardware and computer software in the application. Whether a function is performed by hardware or hardware driven by computer software depends on particular applications and design constraints of the technical solutions. A person skilled in the art may use different methods to implement the described functions for particular applications, but it should not be considered that the implementation goes beyond the scope of the application.

Figure 17:
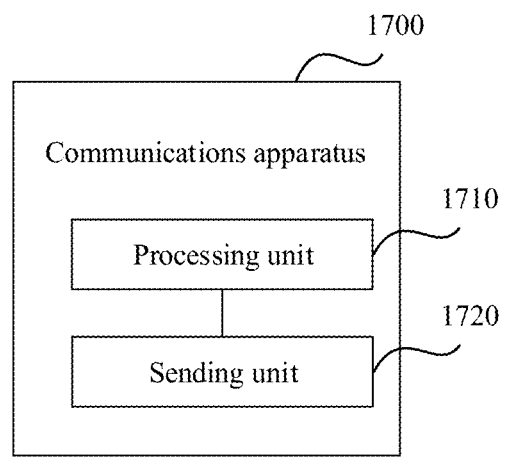
FIG. 17 is a schematic structural diagram of a communications apparatus according to an embodiment of the application.

FIG. 17 is a schematic structural diagram of a communications apparatus 1700 according to an embodiment of the application. The communications apparatus 1700 includes a processing unit 1710 and a sending unit 1720.

The processing unit 1710 is configured to determine a first downlink virtual carrier in N downlink virtual carriers, where the first downlink virtual carrier is used to determine a BWP, the N downlink virtual carriers are configured on at least one downlink carrier in a same cell, and the N downlink virtual carriers correspond to a same subcarrier spacing, N>1, and N is an integer.

The sending unit 1720 is configured to send indication information to a terminal, where the indication information is used to indicate the first downlink virtual carrier.

The communications apparatus 1700 may be a communications device (for example, the terminal), or may be a chip in a communications device. When the communications apparatus is a communications device, the processing unit may be a processor, the sending unit and a receiving unit may be transceivers, the communications device may further include a storage unit, the storage unit may be a memory, the storage unit is configured to store an instruction, and the processing unit executes the instruction stored in the storage unit, so that the communications device performs the foregoing method. When the communications apparatus is a chip inside a communications device, the processing unit may be a processor, the sending unit and the receiving unit may be input/output interfaces, pins, circuits, or the like, the processing unit executes an instruction stored in a storage unit, so that the communications device performs corresponding operations performed by the terminal, the storage unit may be a storage unit (for example, a register or a cache) inside the chip, or may be a storage unit (for example, a read-only memory or a random access memory) outside the chip and inside the communications device.

A person skilled in the art may clearly learn that, when the communications apparatus 1700 is the terminal, for operations performed by the communications apparatus 1700 and corresponding beneficial effects, refer to related descriptions of the terminal in FIG. 2, or related descriptions of the receive end or the transmit end in FIG. 12 or FIG. 14. For brevity, details are not described herein again.

Figure 18:
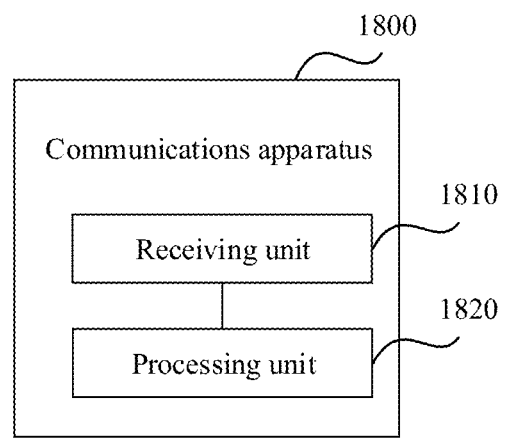
FIG. 18 is a schematic structural diagram of a communications apparatus according to an embodiment of the application.

FIG. 18 is a schematic structural diagram of a communications apparatus 1800 according to an embodiment of the application. The communications apparatus 1800 includes a receiving unit 1810 and a processing unit 1820.

The receiving unit 1810 is configured to receive indication information.

The processing unit 1820 is configured to determine a first downlink virtual carrier in N downlink virtual carriers based on the indication information, where the N downlink virtual carriers are configured on at least one downlink carrier in a same cell, the N downlink virtual carriers correspond to a same subcarrier spacing, N>1, and N is an integer.

The processing unit 1820 is further configured to determine a carrier bandwidth part BWP based on the first downlink virtual carrier.

The communications apparatus 1800 may be a communications device (for example, the network device), or may be a chip in a communications device. When the communications apparatus is a communications device, the processing unit may be a processor, the sending unit and a receiving unit may be transceivers, the communications device may further include a storage unit, the storage unit may be a memory, the storage unit is configured to store an instruction, and the processing unit executes the instruction stored in the storage unit, so that the communications device performs the foregoing method. When the communications apparatus is a chip inside a communications device, the processing unit may be a processor, the sending unit and the receiving unit may be input/output interfaces, pins, circuits, or the like, the processing unit executes an instruction stored in a storage unit, so that the communications device performs corresponding operations performed by the network device, the storage unit may be a storage unit (for example, a register or a cache) inside the chip, or may be a storage unit (for example, a read-only memory or a random access memory) outside the chip and inside the communications device.

A person skilled in the art may clearly learn that, when the communications apparatus 1800 is the network device, for operations performed by the communications apparatus 1800 and corresponding beneficial effects, refer to related descriptions of the network device in FIG. 2, or related descriptions of the transmit end and the receive end in FIG. 12 or FIG. 14. For brevity, details are not described herein again.

It should be understood that division into the foregoing units is merely function division, and there may be another division method in actual implementation.

It may be clearly learned by a person skilled in the art that, for working processes of the apparatus and units described above and for technical effects generated by performing the operations, refer to descriptions in the foregoing method embodiments. For brevity, details are not described herein again.

The communications apparatus may be a chip. The processing unit may be implemented by using hardware or software. When the processing unit is implemented by using hardware, the processing unit may be a logic circuit, an integrated circuit, or the like. When the processing unit is implemented by using software, the processor may be a general purpose processor, and is implemented by reading software code stored in a storage unit. The storage unit may be integrated into a processor, or may be located outside the processor and exist independently.

The following further describes, by using an example in which the communications apparatus is the terminal or the network device, the communications apparatus provided in the application.

Figure 19:
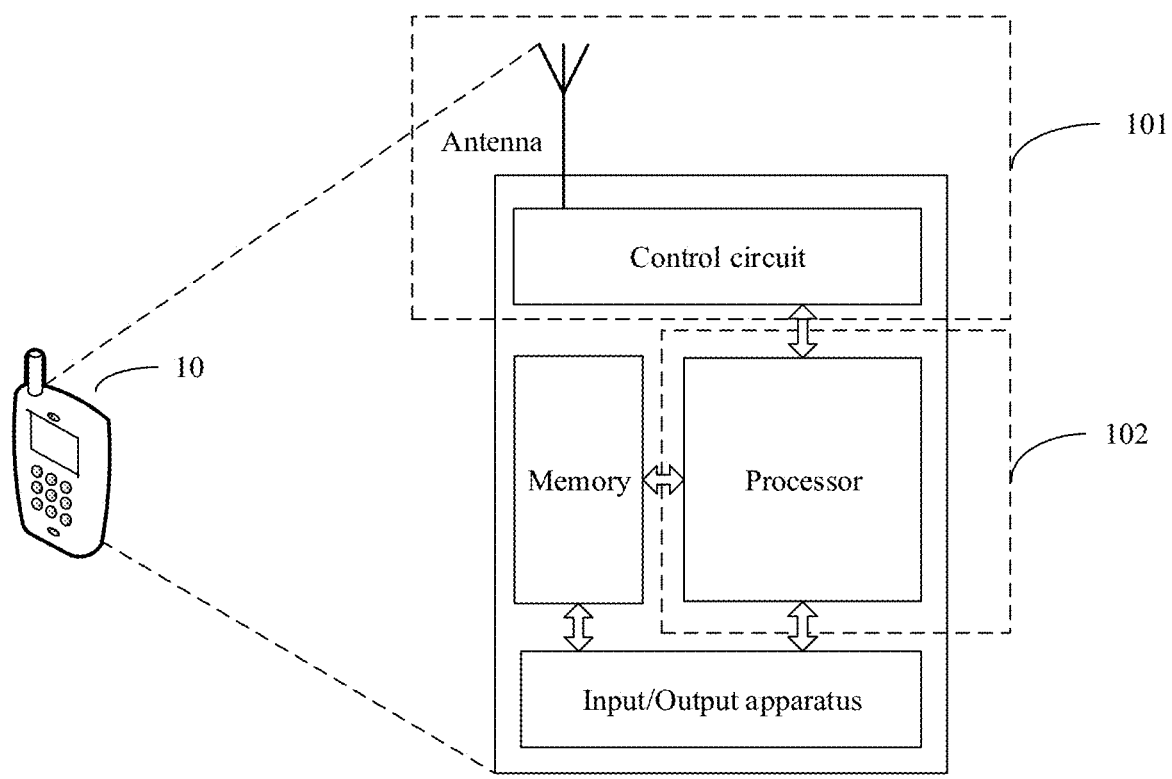
FIG. 19 is a schematic structural diagram of a terminal according to an embodiment of the application.

FIG. 19 is a schematic structural diagram of a terminal 10 according to an embodiment of the application. For ease of description, FIG. 19 shows only main components of the terminal. As shown in FIG. 19, the terminal 10 includes a processor, a memory, a control circuit, an antenna, and an input/output apparatus.

The processor is mainly configured to: process a communication protocol and communication data, control the entire terminal, execute a software program, and process data of the software program, for example, is configured to support the terminal in performing the action described in the foregoing embodiments of the resource configuration method or the communication method. The memory is mainly configured to store a software program and data. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen, a display screen, or a keyboard, is mainly configured to receive data input by a user and output data to the user.

After the terminal is powered on, the processor can read a software program in a storage unit, interpret and execute an instruction of the software program, and process data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal to the outside through the antenna in an electromagnetic wave form. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 19 shows only one memory and one processor. An actual terminal may include a plurality of processors and a plurality of memories. The memory may also be referred to as a storage medium, a storage device, or the like. This is not limited in this embodiment of the application.

In an optional embodiment, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 19 integrates functions of the baseband processor and the central processing unit. A person skilled in the art may understand that, alternatively, the baseband processor and the central processing unit may be processors independent of each other, and interconnected by using a technology such as a bus. A person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

For example, in an embodiment of the application, the antenna and the control circuit that have a transceiver function may be considered as a transceiver unit 101 of the terminal 10, and the processor having a processing function may be considered as a processing unit 102 of the terminal 10. As shown in FIG. 19, the terminal 10 includes the transceiver unit 101 and the processing unit 102. The transceiver unit may also be referred to as a transceiver, a transceiver machine, a transceiver apparatus, or the like. In an embodiment, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver machine, a receiver, a receiving circuit, or the like, and the sending unit may be referred to as a transmitter machine, a transmitter, a transmitting circuit, or the like.

The terminal shown in FIG. 19 may perform actions performed by the terminal in the foregoing method. To avoid repetition, detailed descriptions thereof are omitted herein.

Figure 20:
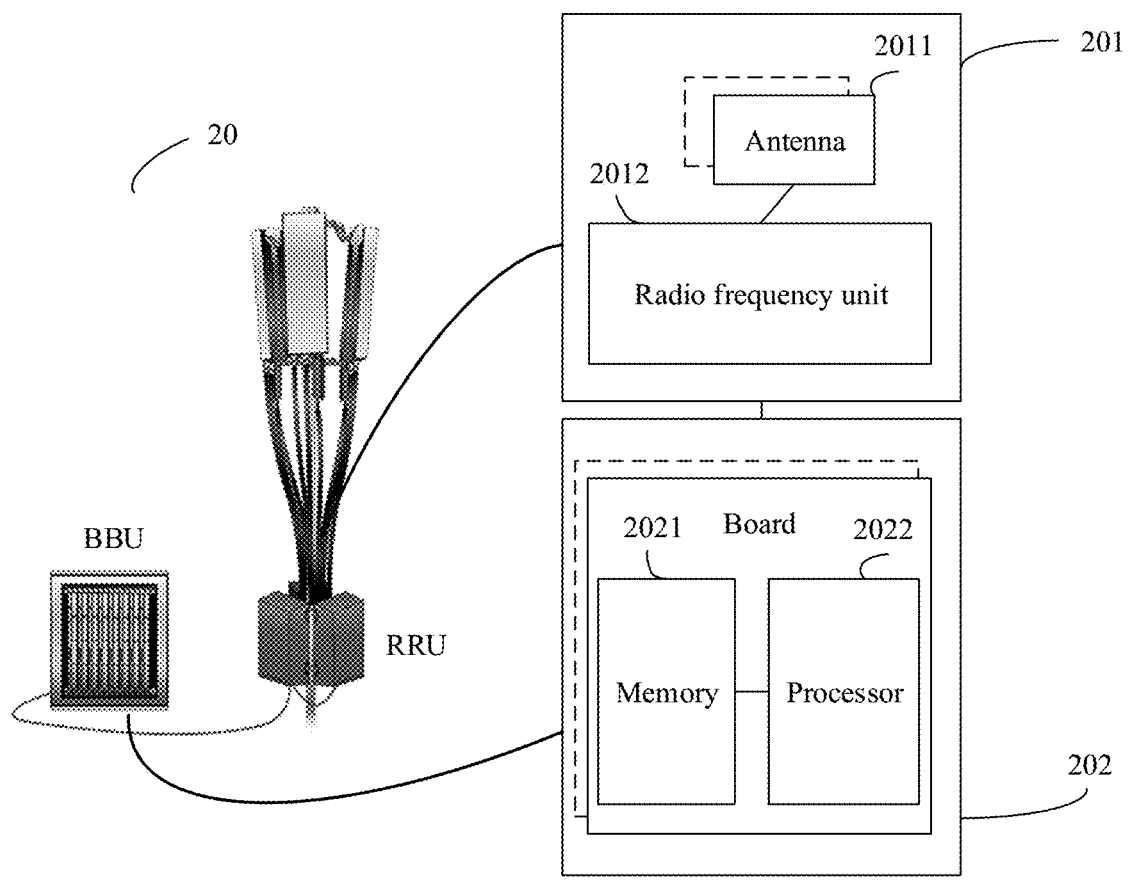
FIG. 20 is a schematic structural diagram of a network device according to an embodiment of the application.

FIG. 20 is a schematic structural diagram of a network device according to an embodiment of the application. The network device may be, for example, a base station. As shown in FIG. 20, the base station may be applied to the communications system shown in FIG. 1, and perform a function of the network device in the foregoing method embodiment. The base station 20 may include one or more radio frequency units, such as a remote radio unit (remote radio unit, RRU) 201 and one or more baseband units (baseband unit, BBU) (which may also be referred to as a digital unit (digital unit, DU)) 202. The RRU 201 may be referred to as a transceiver unit, a transceiver machine, a transceiver circuit, a transceiver, or the like, and may include at least one antenna 2011 and a radio frequency unit 2012. The RRU 201 part is mainly configured to perform receiving and sending of a radio frequency signal and conversion between a radio frequency signal and a baseband signal, for example, configured to send the PDCCH and/or the PDSCH in the foregoing method embodiment. The BBU 202 is mainly configured to perform baseband processing, control the base station, and the like. The RRU 201 and the BBU 202 may be physically disposed together, or may be physically separated, that is, in a distributed base station.

The BBU 202 is a control center of the base station, may also be referred to as a processing unit, and is mainly configured to complete baseband processing functions such as channel coding, multiplexing, modulation, and spectrum spreading. For example, the BBU (the processing unit) 202 may be configured to control the base station to perform an operation procedure related to the network device in the foregoing method embodiment.

In an embodiment, the BBU 202 may include one or more boards. A plurality of boards may jointly support a radio access network (such as an LTE network) of a single access standard, or may separately support radio access networks (such as an LTE network, a 5G network, or another network) of different access standards. The BBU 202 further includes a memory 2021 and a processor 2022. The memory 2021 is configured to store a necessary instruction and necessary data. For example, the memory 2021 stores the QCL information or the TCI state in the foregoing method embodiment. The processor 2022 is configured to control the base station to perform a necessary action, for example, is configured to control the base station to perform an operation procedure related to the network device in the foregoing method embodiment. The memory 2021 and the processor 2022 may serve the one or more boards. In other words, a memory and a processor may be disposed on each board. Alternatively, a plurality of boards may share a same memory and a same processor. In addition, a necessary circuit may be further disposed on each board.

The application further provides a communications system, including the foregoing one or more network devices and one or more terminals.

It should be understood that the processor in an embodiment of the application may be an integrated circuit chip, and has a signal processing capability. In an implementation process, operations in the foregoing method embodiments may be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the operations, and logical block diagrams that are disclosed in the embodiments of the application. The general-purpose processor may be a microprocessor, any conventional processor, or the like. The operations of the methods disclosed with reference to the embodiments of the application may be directly performed and completed by using a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the operations in the foregoing methods in combination with hardware of the processor.

It may be understood that the memory in the embodiments of the application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example description but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

The application further provides a computer-readable medium. The computer-readable medium stores a computer program. When the computer program is executed by a computer, a function in any one of the foregoing method embodiments is implemented.

The application further provides a computer program product. When the computer program product is executed by a computer, a function in any one of the foregoing method embodiments is implemented.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that an "embodiment" mentioned in the entire specification means that particular characteristics, structures, or features related to the embodiment are included in at least one embodiment of the application. Therefore, the embodiments in the entire specification do not necessarily refer to a same embodiment. In addition, these particular characteristics, structures, or features may be combined in one or more embodiments in any appropriate manner. It should be understood that sequence numbers of the foregoing processes do not mean execution sequences in various embodiments of the application. The execution sequences of the processes should be determined based on functions and internal logic of the processes, and should not be construed as any limitation on the implementation processes of the embodiments of the application.

It should be further understood that, in the application, both "when" and "if" mean that the UE or the base station performs corresponding processing in an objective situation, are not intended to limit time, do not require the UE or the base station to perform a determining action during implementation, and do not mean that there is another limitation either.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of", or "at least one type of" in this specification indicates all of or any combination of the listed items, for example, "at least one of A, B, and C" may indicate the following six cases: Only A exists, only B exists, only C exists, both A and B exist, both B and C exist, and A, B and C all exist.

It should be understood that in the embodiments of the application, "B corresponding to A" indicates that B is associated with A, and B may be determined based on A. However, it should be further understood that determining B based on A does not mean that B is determined based on A only; that is, B may also be determined based on A and/or other information.

A person of ordinary skill in the art may be aware that, in combination with the examples described in the embodiments disclosed in this specification, units and algorithm operations may be implemented by electronic hardware, computer software, or a combination thereof. To clearly describe interchangeability between the hardware and the software, the foregoing has generally described compositions and operations of each example based on functions. Whether the functions are performed by hardware or software depends on particular applications and design constraint conditions of the technical solutions. A person skilled in the art may use different methods to implement the described functions for particular applications, but it should not be considered that the implementation goes beyond the scope of the application.

According to the descriptions of the foregoing implementations, a person skilled in the art may clearly learn that the application may be implemented by hardware, firmware, or a combination thereof. When the application is implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of an instruction or a data structure and can be accessed by a computer. In addition, any connection may be appropriately defined as a computer-readable medium. For example, if the software is transmitted from a website, a server, or another remote source through a coaxial cable, an optical fiber/cable, a twisted pair, a digital subscriber line (DSL), or wireless technologies such as infrared ray, radio, and microwave, the coaxial cable, the optical fiber/cable, the twisted pair, the DSL, or the wireless technologies such as infrared ray, radio, and microwave are included in fixation of a medium to which they belong. A disk (disk) and a disc (disc) used in the application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination should also be included in the protection scope of the computer-readable medium.

In conclusion, the foregoing descriptions are merely example embodiments of the technical solutions of the application, but are not intended to limit the protection scope of the application. Any modification, equivalent replacement, or improvement made without departing from the spirit and principle of the application shall fall within the protection scope of the application.

What is claimed is:

1. A resource configuration method, comprising:
determining, by a network device, a first downlink virtual carrier in N downlink virtual carriers, wherein the first downlink virtual carrier is used to determine a carrier bandwidth part (BWP), wherein the N downlink virtual carriers are on at least one downlink carrier in a same cell wherein the at least one downlink carrier includes a plurality of spectrum resources of a discrete spectrum and a contiguous spectrum of a segment of non-standard bandwidth, wherein the N downlink virtual carriers with a same parameter set are configured in a same cell to enable a terminal to work on discrete spectrums and non-standard bandwidth spectrums, wherein N>1, and N is an integer; and
sending, by the network device, indication information to the terminal, wherein the indication information is used to indicate the first downlink virtual carrier.

2. The method according to claim 1, further comprising:
sending, by the network device, configuration information to the terminal, wherein the configuration information is used to configure the N downlink virtual carriers.

3. The method according to claim 2, wherein the configuration information comprises at least two offsets of at least two downlink virtual carriers in the N downlink virtual carriers, wherein the at least two offsets are offsets of frequency domain resources of the at least two downlink virtual carriers relative to a same reference point.

4. The method according to claim 3, wherein at least one of the at least two offsets comprises B1 subcarriers, wherein B1 is an integer greater than 0.

5. The method according to claim 2, wherein the configuration information comprises indexes of common resource blocks corresponding to at least two downlink virtual carriers in the N downlink virtual carriers, wherein the common resource blocks corresponding to the at least two downlink virtual carriers have a same reference point.

6. A resource configuration method, comprising:
receiving, by a terminal, indication information;
determining, by the terminal, a first downlink virtual carrier in N downlink virtual carriers based on the indication information, wherein the N downlink virtual carriers are on at least one downlink carrier in a same cell, wherein the at least one downlink carrier includes a plurality of spectrum resources of a discrete spectrum and a contiguous spectrum of a segment of non-standard bandwidth, wherein the N downlink virtual carriers with a same parameter set are configured in a same cell to enable the terminal to work on discrete spectrums and non-standard bandwidth spectrums, wherein N>1, and N is an integer; and
determining, by the terminal, a carrier bandwidth part BWP based on the first downlink virtual carrier.

7. The method according to claim 6, further comprising:
receiving, by the terminal, configuration information, wherein the configuration information is used to configure the N downlink virtual carriers; and
determining, by the terminal, the N downlink virtual carriers based on the configuration information.

8. The method according to claim 7, wherein the configuration information comprises at least two offsets of at least two downlink virtual carriers in the N downlink virtual carriers, wherein the at least two offsets are offsets of frequency domain resources of the at least two downlink virtual carriers relative to a same reference point.

9. The method according to claim 8, wherein at least one of the at least two offsets comprises B1 subcarriers, wherein B1 is an integer greater than 0.

10. The method according to claim 7, wherein the configuration information comprises indexes of common resource blocks corresponding to at least two downlink virtual carriers in the N downlink virtual carriers, wherein the common resource blocks corresponding to the at least two downlink virtual carriers have a same reference point.

11. A communications apparatus, comprising:
a processing unit to determine a first downlink virtual carrier in N downlink virtual carriers, wherein the first downlink virtual carrier is used to determine a carrier bandwidth part (BWP), wherein the N downlink virtual carriers are on at least one downlink carrier in a same cell, wherein the at least one downlink carrier includes a plurality of spectrum resources of a discrete spectrum and a contiguous spectrum of a segment of non-standard bandwidth, wherein the N downlink virtual carriers with a same parameter set are configured in a same cell to enable a terminal to work on discrete spectrums and non-standard bandwidth spectrums, wherein N>1, and N is an integer; and
a sending unit to send indication information to the terminal, wherein the indication information is used to indicate the first downlink virtual carrier.

12. The communications apparatus according to claim 11, wherein the sending unit is further to:
send configuration information to the terminal, wherein the configuration information is used to configure the N downlink virtual carriers.

13. The communications apparatus according to claim 12, wherein the configuration information comprises at least two offsets of at least two downlink virtual carriers in the N downlink virtual carriers, wherein the at least two offsets are offsets of frequency domain resources of the at least two downlink virtual carriers relative to a same reference point.

14. The communications apparatus according to claim 13, wherein at least one of the at least two offsets comprises B1 subcarriers, wherein B1 is an integer greater than 0.

15. The communications apparatus according to claim 12, wherein the configuration information comprises indexes of common resource blocks corresponding to at least two downlink virtual carriers in the N downlink virtual carriers, wherein the common resource blocks corresponding to the at least two downlink virtual carriers have a same reference point.

16. A communications apparatus, comprising:
a receiving unit to receive indication information; and
a processing unit to determine a first downlink virtual carrier in N downlink virtual carriers based on the indication information, wherein the N downlink virtual carriers are on at least one downlink carrier in a same cell, wherein the at least one downlink carrier includes a plurality of spectrum resources of a discrete spectrum and a contiguous spectrum of a segment of non-standard bandwidth, wherein the N downlink virtual carriers with a same parameter set are configured in a same cell to enable the apparatus to work on discrete spectrums and non-standard bandwidth spectrums, wherein N>1, and N is an integer; and
the processing unit is further to determine a carrier bandwidth part BWP based on the first downlink virtual carrier.

17. The communications apparatus according to claim 16, wherein the receiving unit is further to:

receive configuration information, wherein the configuration information is used to configure the N downlink virtual carriers; and the processing unit is further to determine the N downlink virtual carriers based on the configuration information.

18. The communications apparatus according to claim 17, wherein the configuration information comprises at least two offsets of at least two downlink virtual carriers in the N downlink virtual carriers, wherein the at least two offsets are offsets of frequency domain resources of the at least two downlink virtual carriers relative to a same reference point.

19. The communications apparatus according to claim 18, wherein at least one of the at least two offsets comprises B1 subcarriers, wherein B1 is an integer greater than 0.

20. The communications apparatus according to claim 17, wherein the configuration information comprises indexes of common resource blocks corresponding to at least two downlink virtual carriers in the N downlink virtual carriers, wherein the common resource blocks corresponding to the at least two downlink virtual carriers have a same reference point.

\* \* \* \* \*